(12) United States Patent
Rothwein et al.

(10) Patent No.: US 7,594,181 B2
(45) Date of Patent: Sep. 22, 2009

(54) PROTOTYPING GRAPHICAL USER INTERFACES

(75) Inventors: Thomas M. Rothwein, San Jose, CA (US); John L. Coker, Hillsborough, CA (US); Mark Curtis Hastings, Palo Alto, CA (US); Fuad Rashid, San Mateo, CA (US); Bharat Jindal, San Francisco, CA (US); Shu Lei, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 894 days.

(21) Appl. No.: 10/185,401

(22) Filed: Jun. 27, 2002

(65) Prior Publication Data

US 2004/0001092 A1    Jan. 1, 2004

(51) Int. Cl.
*G06K 15/00* (2006.01)
(52) U.S. Cl. .................................. 715/763; 715/747
(58) Field of Classification Search ......... 715/762–763, 715/853–855, 745, 747, 744, 966–967, 969
See application file for complete search history.

(56) References Cited

U.S. PATENT DOCUMENTS

| | | | |
|---|---|---|---|
| 5,325,534 A | 6/1994 | Galy et al. | 395/700 |
| 6,330,007 B1 | 12/2001 | Isreal et al. | 345/762 |
| 6,792,608 B1 * | 9/2004 | Theeten | 719/316 |
| 6,971,065 B2 * | 11/2005 | Austin | 715/763 |
| 2001/0027456 A1 * | 10/2001 | Lancaster et al. | 707/104.1 |
| 2001/0035879 A1 * | 11/2001 | Washington et al. | 345/763 |
| 2002/0196283 A1 * | 12/2002 | Petruk et al. | 345/763 |
| 2003/0035005 A1 * | 2/2003 | Kodosky et al. | 345/763 |
| 2003/0038842 A1 * | 2/2003 | Peck et al. | 345/763 |
| 2003/0184585 A1 * | 10/2003 | Lin et al. | 345/763 |
| 2004/0015849 A1 * | 1/2004 | Sanchez, II | 717/116 |
| 2004/0221238 A1 * | 11/2004 | Cifra et al. | 715/762 |
| 2005/0075966 A1 * | 4/2005 | Duka | 705/37 |

FOREIGN PATENT DOCUMENTS

WO    WO 01/71566 A1    9/2001

* cited by examiner

*Primary Examiner*—Steven P Sax
(74) *Attorney, Agent, or Firm*—Campbell Stephenson LLP

(57) ABSTRACT

A method, system, and computer-readable medium is described for creating a prototype GUI for conversion into an actual GUI whose appearance when displayed matches the appearance of the prototype GUI. In some situations, multiple personnel may participate in the process, such as a non-technical GUI designer that specifies the prototype GUI appearance information and a technical GUI developer that specifies various non-appearance information for a corresponding actual GUI. A prototype GUI is first created based on layout and other appearance information specified for various GUI elements, and corresponding proxy GUI objects are generated that store appearance information but not various non-appearance information used as part of an actual GUI. Proxy GUI objects for a prototype GUI can then be converted into actual GUI objects for use with an actual GUI, and various non-appearance information can be specified for the actual GUI objects in various ways.

12 Claims, 16 Drawing Sheets

PROTOTYPING GRAPHICAL USER INTERFACES

TECHNICAL FIELD

The following disclosure relates generally to developing graphical user interfaces ("GUIs"), and more particularly to generating prototype GUIs in such a manner that they can be easily converted to actual GUIs, such as to allow a non-technical GUI designer to specify the appearance of a prototype GUI that can be easily converted by a technical GUI developer to an actual GUI whose appearance when displayed matches the appearance of the prototype GUI.

BACKGROUND

Many software programs and online services have graphical user interfaces (GUIs) with which users can interact and receive displayed information. While it was originally the case that the software engineers (also referred to as "developers") that created the software code for an underlying program also developed the corresponding GUI, it is increasingly the case that non-technical personnel other than the software engineers may design at least portions of GUIs. Such non-technical GUI designers may include various types of personnel in different situations, such as psychologists that specialize in optimizing human-computer interfaces or business people serving as product managers for products with software or online service components.

Unfortunately, existing techniques for generating GUIs do not facilitate the interaction of multiple distinct personnel, such as non-technical GUI designers and technical GUI developers. For example, non-technical GUI designers can simulate the visual appearance of GUIs in various ways, such as by using drawing or desktop publishing programs to manually specify the appearance of various GUI elements (e.g., buttons, scroll bars, pop-up windows, drop-down menus, text input areas, tables, charts, images, video, text display areas, etc.) that are part of that GUI. In addition, there may even be software tools available to GUI designers that are specifically designed to assist in the creation of simulated GUI appearances, such as by providing visual representations of various GUI elements that can be added (e.g., via drag-and-drop interactions) to a simulated GUI. However, although such techniques allow a GUI designer to specify a simulated appearance of a GUI, it can be difficult or even impossible for GUI developers to generate an actual GUI that has the same appearance, such as due to complexities of the simulated appearance or to aspects of the simulated appearance that do not accurately represent the display capabilities and/or functionality of an actual GUI.

In addition, existing techniques allow GUI developers to create actual GUIs in various ways. For example, software development tools may allow GUI developers to specify underlying GUI objects corresponding to GUI elements to be displayed as part of an actual GUI. The GUI elements may be of various types, and the corresponding GUI objects may include various information to support the display of those GUI elements. For example, some GUI elements display data (e.g., from an external data source such as a database), and the software developer can specify information relating to data to be displayed (e.g., data bindings for accessing an external data source, or information for selecting and/or formatting data for display) for a corresponding GUI object. In addition, some GUI elements respond to interactions with users in various ways, provide various functionality, and/or have various types of inter-dependencies with other GUI elements, and the software developer may be able to specify information for corresponding GUI objects to provide those interaction responses, functionality and inter-dependencies (e.g., indications of software routines for handling various types of interactions or events). However, while such techniques allow GUI developers to specify the underlying GUI objects that can be used as part of an actual GUI, they do not easily allow non-technical GUI developers to participate in the generation of such actual GUIs.

A variety of software development tools (or "SDTs") are available to GUI developers (e.g., the Siebel Tools portion of Siebel eBusiness Applications version 7, commercially available before June of 2001), and can provide a variety of additional functionality to assist in the creation and/or modification of software programs that include actual GUIs.

Some SDTs may abstract software to be generated in various ways, and may then provide functionality related to that abstraction. For example, some SDTs may support a layered architecture in which objects in a given layer depend on objects in the next lower layer and are insulated from other layers in the structure. One such layered structure includes a logical user interface objects layer (e.g., that includes user interface objects to define the visual interface that a user sees and interacts with), a business objects layer (e.g., that includes business objects to combine data from data objects into logical data constructs for presentation to the user by user interface objects), and a data objects layer (e.g., that includes data objects to provide a logical representation of data structures from underlying databases in order to provide access to those data structures by business objects). SDTs with such a layered structure may allow corresponding objects to be defined at some or all of the layers as part of a software program being generated.

Objects can also be used in various ways by SDTs, such as by having each object implement one piece of a software program being generated. Such software program pieces implemented by objects may include, for example, an element of a user interface (e.g., a popup window for record selection), an abstract data representation (e.g., a database column), or a direct database representation or construct (e.g., a join relationship between database tables). Properties of such an object may represent characteristics of the software construct that the object implements (e.g., the name, data type, and length of a database column, or the title bar caption of a popup window). Some SDTs may also support hierarchical (or parent-child) relationships between different objects, such as when a parent object represents a table and child objects represent columns of the table.

SDTs may represent created objects in various ways, such as with a set of properties having assigned values. The created objects may be implemented directly as an object in an underlying object-oriented programming language (e.g., C++), or instead may be abstracted in various ways. In addition, some or all objects may have assigned sets of behaviors, such as by having an associated set of one or more software routines (e.g., via a DLL assigned to the object). An SDT may also provide one or more existing objects, such as a core set of objects, and allow a user to use those existing objects as a basis for an application being generated.

In addition, some SDTs may support having object types from which objects of that type can be created, with the object types having defined sets of properties. Objects created from an object type may have values for each of the properties of the object type, such as user-specified or default values, and may be limited by some SDTs to having values only for the properties of the corresponding object type. In some SDTs, object types may also have parent-child relationships with other object types, with a parent object type able to have numerous children object types. An SDT may also provide one or more existing object types, such as a predefined set of object types that have specific purposes (e.g., an applet object type for "applets" that define a user interface unit, or a business component object type for business objects that each define a data record structure from one or more database tables).

Some SDTs may also support generating multiple different projects, and if so may associate some or all objects being created with one or more projects (e.g., to associate objects that are part of an application being created with the project to which that application is associated).

SDTs may also provide a variety of tools to assist in viewing and/or manipulating (e.g., adding, editing and deleting) objects, such as an object editor window that displays a table in which each row represents an object and each column represents a property of that object. A property setting for an object may be changed by clicking the corresponding cell in the table and supplying a new value (e.g., that is manually entered or selected from a pick list), and objects may be added to or deleted from the table. Some SDTs may also provide a properties window that provides additional details about the properties of a specific object, such as an object selected in the object editor window (e.g., a selected row of the table). In a similar manner, some SDTs may provide tools for viewing and/or manipulating object types, such as an object explorer window that uses a visual metaphor for displaying hierarchical object type relationships that is similar to that of the Windows Explorer program in Windows 2000 or NT. Such an object explorer window may operate in parallel with a corresponding object editor window, such as by displaying objects of a particular type in the object editor window when that object type is selected in the object explorer window.

In addition, some SDTs may provide various tools to assist in creating objects. For example, software wizards may be provided for each of various object types to step users through the process of creating and configuring objects of those types. In particular, a wizard may guide the user through providing various types of information, and then use that information to specify property settings for the object being created. Different wizards may be available from some SDTs for a variety of object types, such as table applets, chart applets, tree applets, form applets, multi-value group applets, pick list applets, views, screens, etc. In addition, tools may be available to validate created objects to help ensure that the objects are logically consistent, such as to check for invalid references to other objects.

As mentioned above, some SDTs may allow logical user interface objects to be specified for a software program in order to define the visual interface that a user of the software program will interact with. Such user interface objects may present data to users for viewing and/or modification, such as data from business objects. A variety of user interface elements may be represented by user interface objects, including control toolbar and menu elements, dropdown lists, view tabs, screen tabs, menu buttons, control buttons, etc.

One example of a type of logical user interface object in some SDTs is an "applet" object type that is used to implement higher-level user interface elements composed of lower-level user interface elements, such as data controls, editable scrolling tables, forms for data entry, business graphics, pop-up windows for multi-value groups and record selection, etc. that are composed of controls such as a text box, check box, command button, etc. For some SDTs, an applet provides access to the data of a single business component (e.g., for viewing, editing, and modifying fields in the business component), and may be able to be configured to allow data entry for a single record, to provide a scrolling table displaying multiple records, or to display business graphics or a navigation tree.

Some SDTs may also support a "view" user interface object type that is used to present one or more other user interface objects (e.g., applet objects) together at one time in a predefined visual arrangement and logical data relationship. Views may have names, and in some user interfaces may be selected by name from menus and/or displayed tab symbols. For some SDTs, each view is mapped to a single business object, and if so each applet in such a view may map to a business component in that business object.

Some SDTs may also support "screens" that are a collection of one or more related views, such as with an appropriate screen user interface object type. For some SDTs, all views in some or all screens are mapped to the same business object. In addition, for some SDTs a screen is not a visual construct itself, but is instead a logical collection of views to be displayed together.

Some SDTs may use a collection of screens as a user interface for a software program (or "application"). In some situations, an application may have one or more associated URLs that a user may specify to access the application, such as when a Web engine will be used to generate HTML pages to present the screens. One or more page tabs may be displayed, with each page tab object associated with a screen of the application.

Some SDTs may also provide additional functionality to assist in creating user interfaces, such as templates that define the layout and formatting of various elements of the user interface, tags that are inserted in templates to specify how objects should be laid out and formatted for that template, cascading style sheets that define how HTML or XML elements and their contents should appear in a Web document, etc.

In addition to the previously described tools to assist in viewing and/or manipulating objects, some SDTs may also provide tools to assist in specifying a layout of elements of a user interface and/or to display objects (e.g., pages, applets, views, etc.) in a manner similar to their actual appearance when displayed (e.g., in a WYSIWYG manner). For example, some SDTs may provide layout windows for various types of objects (e.g., views, applets, screens, and menus) to allow a user to modify and/or construct objects of that type by dragging and dropping other objects onto a representation of that object, such as based on an associated template that has placeholders for the objects being added. An applet layout window allows controls to be added to an applet, a view layout window allows applets and controls to be added to a view, and a screen (or "page") layout window allows views and controls to be added to a screen. Indications of the objects to be added (e.g., views, applets and controls) may also be displayed in various ways. Some SDTs may also provide tools to modify existing templates and/or to create new templates, as well as to associate templates with objects as needed.

Thus, while various existing techniques assist in generating GUIs, they do not facilitate the interaction of multiple distinct personnel such as non-technical GUI designers and technical GUI developers. Accordingly, it would be beneficial to provide techniques to allow multiple personnel to participate in the creation of a GUI, such as to allow a non-technical GUI designer to create a prototype GUI that can be easily converted into an actual GUI whose appearance when displayed matches the appearance of the prototype GUI.

DETAILED DESCRIPTION

I. Introduction

Figure 1:
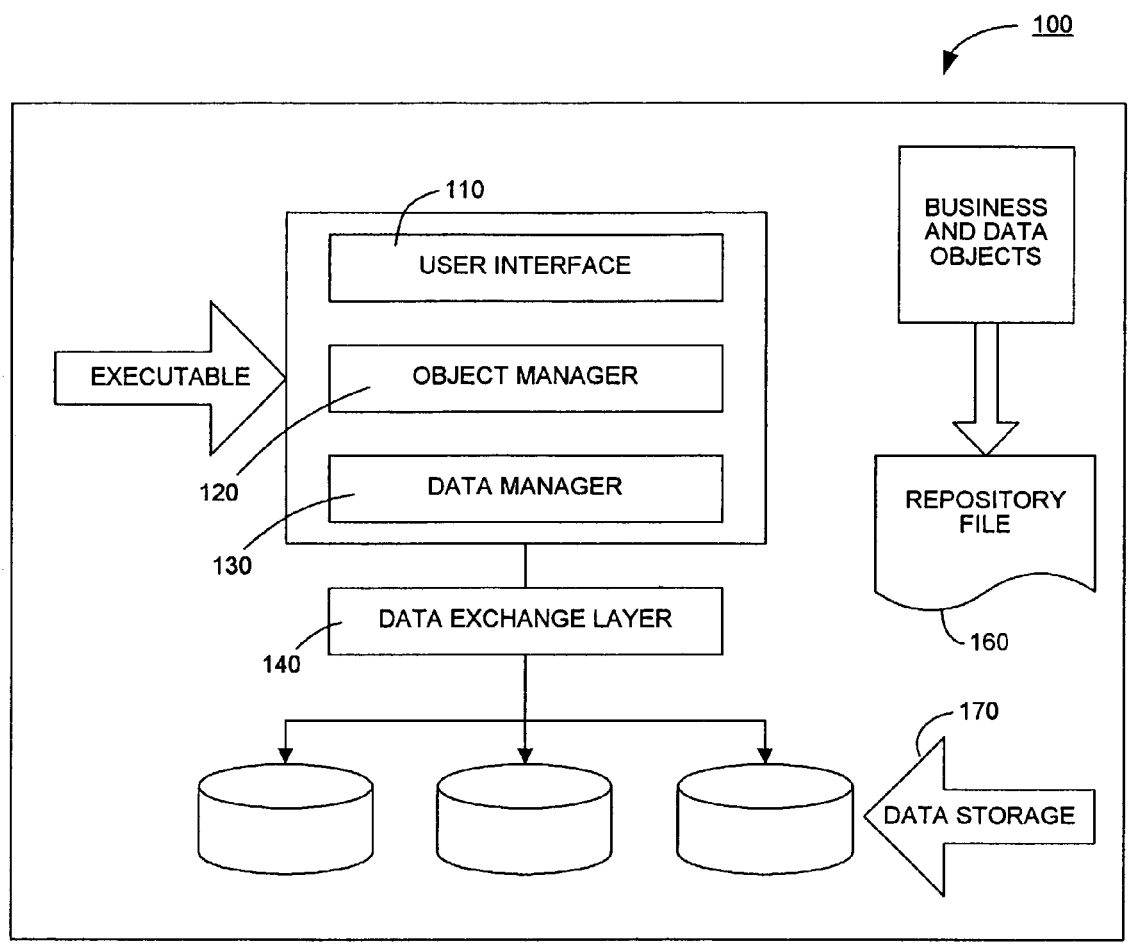
FIG. 1 shows a multi-layered system architecture within which the described techniques can be implemented.

A software facility is described below that allows a prototype GUI to be created in such a manner as to be easily converted into an actual GUI whose appearance when displayed matches the appearance of the prototype GUI. In some embodiments, multiple distinct personnel may participate in the process, such as one or more non-technical GUI designers that specify appearance information for a prototype GUI and one or more technical GUI developers that specify various non-appearance information for a corresponding actual GUI.

In particular, in some embodiments a user creates a prototype GUI by visually selecting various GUI elements to be added to the prototype GUI and then specifying layout and other appearance information for those GUI elements. The GUI elements and their corresponding appearance information can be specified by a user in various ways. For example, in some embodiments a user may use drag-and-drop techniques to select displayed indications of types of GUI elements from a toolbar, or instead may select a GUI element type from a displayed pop-up menu. The user may also specify layout information for the GUI elements in various ways, such as by dragging a visual representation of a GUI element to a desired location or by indicating a position of a GUI element being added based on the position of the cursor when a pop-up menu is invoked. Various other types of appearance information for the GUI elements can also be specified in various ways, such as by modifying a default visual representation for a GUI element to have an appearance specific to that GUI element (e.g., specifying a title or other text to be displayed, font type and size, GUI element size information, color information, etc.) or instead specifying appearance information (e.g., a color scheme or style of control GUI element) to be shared among some or all of the specified GUI elements.

In some embodiments, various additional tools are provided to assist a user in creating a prototype GUI. For example, a software WYSIWYG (What You See Is What You Get) layout editor may be available to display visual representations of the GUI elements in accordance with any specified appearance information and in such a manner that the appearance of the prototype GUI is the same as that of a corresponding actual GUI when later displayed. The layout editor may also allow the user to easily modify the layout of the various GUI elements, such as based on visual indications (e.g., on a displayed screen via a mouse or tablet input device) from the user. In addition, in some embodiments a GUI template can be selected and associated with a prototype GUI to provide various appearance information, such as default appearance information that can be overridden. Some GUI templates may also assist in layout of GUI elements by providing one or more location placeholders in specified locations that are each able to display one or more GUI elements of one or more types. Moreover, in some embodiments software wizards or other programs may be available to assist in the creation of some or all GUI elements (e.g., complicated types of GUI elements such as tables and charts), such as by guiding the user through a series of steps that result in the creation of the GUI element.

As a user creates a prototype GUI that includes various GUI elements, the software facility generates proxy GUI objects that correspond to the GUI elements. These proxy GUI objects can store the layout and other appearance information that is specified by the user, but do not include various nonappearance information that is used as part of an actual GUI (e.g., data bindings to external data sources that will provide data to be displayed, such as databases, software components and/or other objects; bindings to software handler routines to be executed to provide various types of functionality in response to user interactions or other events; etc.). In some embodiments, the proxy GUI objects do not include storage areas and/or access mechanisms to store such nonappearance information, while in other embodiments the proxy GUI objects may include placeholder information (or "stubs") for portions of the proxy GUI object corresponding to such non-appearance information. In addition, in some embodiments each type of GUI element has a corresponding type of proxy GUI object that can store information specific to that type of GUI element.

After one or more GUI elements have been specified for a prototype GUI, some or all of the proxy GUI objects can be converted into actual GUI objects for use with an actual GUI, such as in an automated manner based on an indication received from the user creating the prototype GUI or from a user that will complete the generation of the actual GUI. The actual GUI objects will include the appearance information from the corresponding proxy GUI objects, but are also able to include the various non-appearance information used as part of an actual GUI. In some embodiments the generated actual GUI objects will be distinct objects from the proxy GUI objects, while in other embodiments the generated actual GUI objects will be the same objects but with stub information replaced by actual information. The non-appearance information for the actual GUI objects can be provided in various ways, and can be of a variety of types. For example, in some embodiments a user (e.g., a developer) will manually specify some or all of the information for the actual GUI objects, while in other embodiments some or all of the non-appearance information may be automatically added to the actual GUI objects as part of or after the conversion process. In addition, in some embodiments additional types of information that is not part of the actual GUI objects may be specified as part of completing the actual GUI.

In addition, in some embodiments the techniques described above can similarly be used to modify existing actual GUIs, such as actual GUIs that were previously generated based on prototype GUIs and/or actual GUIs that generated in other manners. In order to modify such an actual GUI, proxy GUI objects are identified for the actual GUI objects of the actual GUI, such as by retrieving information for proxy GUI objects that were previously converted into the actual GUI objects as part of the conversion process or instead by generating new proxy GUI objects in the reverse of the conversion process. Such proxy GUI objects can then be modified as part of a prototype GUI, and can then be converted back into actual GUI objects (e.g., by modifying the previously existing actual GUI objects and/or by generating new actual GUI objects) after the modification is completed.

II. System Overview and Overall Architecture

In one embodiment, a computing system with which the facility is integrated can be logically structured as a multi-layered architecture as shown in FIG. 1. In particular, the logical multi-layered architecture as shown in FIG. 1 provides a platform for common services to support various applications. These services may include a user interface layer 110, an object manager layer 120, a data manager layer 130, and a data exchange layer 140.

The user interface layer 110 may provide a variety of high-level GUI elements such as applets, views, charts and reports that are associated with one or more applications. In one embodiment, various types of clients can be supported via the user interface layer 110. These various types of clients may include traditional connected clients, remote clients, thin clients over an intranet, Java thin clients or non-Windows-based operating systems, HTML clients over the Internet, etc.

The object manager layer 120 may be designed to manage one or more sets of business rules or business concepts associated with one or more applications and to provide the interface between the user interface layer 110 and the data manager layer 130. In one embodiment, the business rules or concepts can be represented as business (or "business process") objects. The business objects may also be designed as configurable software representations of various business rules or concepts, such as accounts, contacts, opportunities, service requests, solutions, etc.

The data manager layer 130 may be designed to maintain logical views of the underlying data and to allow the object manager to function independently of underlying data structures or tables in which data are stored. In one embodiment, the data manager 130 may also provide certain database query functions such as generation of structure query language (SQL) in real-time to access the data. In one embodiment, the data manager 130 is designed to operate on object definitions in a repository file 160 that define the database schema. The data storage services 170 provide the data storage for the data model associated with one or more applications.

The data exchange layer 140 may be designed to handle the interactions with one or more specific target databases and to provide the interface between the data manager layer 130 and the underlying data sources.

Figure 2:
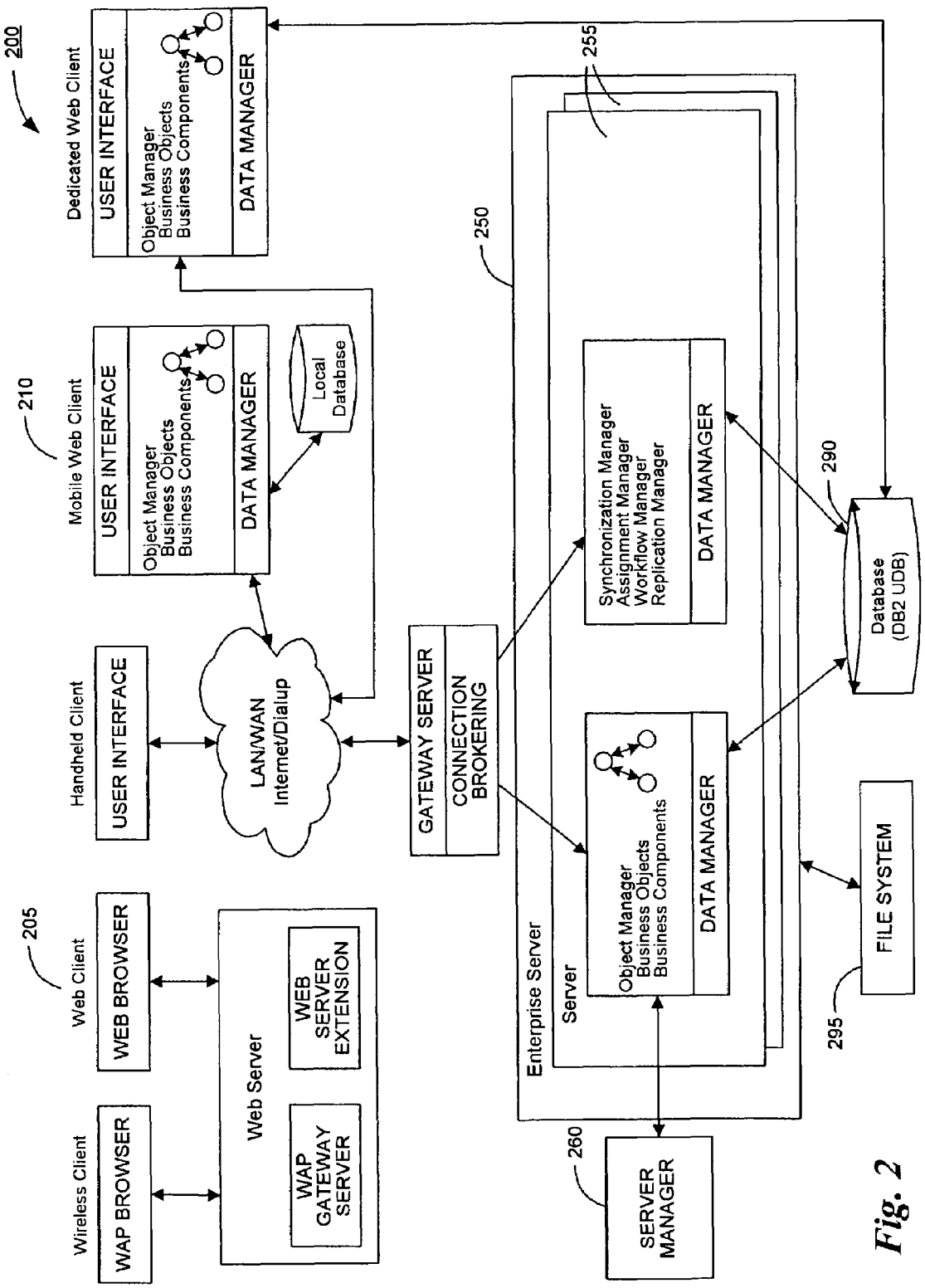
FIG. 2 shows a block diagram of one embodiment of a system configuration in which the described techniques can be implemented.

FIG. 2 shows a block diagram of one embodiment of a computing system configuration in which the facility can operate. In particular, the illustrated multi-layered architecture allows one or more software layers to reside on different machines. For example, the user interface, the object manager, and the data manager may all reside on the dedicated Web clients. For other types of clients such as the wireless clients, the object manager and data manager may reside on a system server. It should be appreciated and understood by one skilled in the art that the system configuration shown in FIG. 2 is for illustrative and explanative purposes, and may vary depending upon the particular implementations and applications of the described techniques.

In one embodiment, the system environment illustrated in FIG. 2 may include more than one database 290, and one or more subsets of the database can be created or replicated by a replication manager. In addition, mobile Web clients can have additional remote databases with respect to the database 290 (also referred to as local databases with respect to those clients). In one embodiment, unless the remote/local databases associated with the mobile Web clients are defined as read-only databases, these mobile Web clients can create and update data locally that will be ultimately propagated up to the primary database when each mobile Web client synchronizes with the system server.

In one embodiment, the database 290 is designed to store various types of data including predefined data schema (e.g., table objects, index objects, etc.), repository objects (e.g., business objects and components, view definitions and visibility rules, etc.), and users' and customers' data. Dedicated Web clients and server components, including those that operate in conjunction with the other types of clients, may connect directly to the database 290 and make changes in real-time. In addition, mobile Web clients may download a subset of the server's data to use locally, and periodically synchronize with the server database through the system server to update both the local and the server database.

In some embodiments, various tables included in the database 290 may be logically organized into the following types: data tables, interface tables, and repository tables, etc. In addition, data tables may be used to store user business data, administrative data, seed data, and transaction data, etc. In one embodiment, these data tables may be populated and updated through the various applications and processes. Data tables may also include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:
  the client application configuration;
  the mapping used for importing and exporting data; and
  rules for transferring data to mobile clients.

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated Web clients can read and write files directly to and from the file system 295. In one embodiment, mobile Web clients can have a local file system, which they synchronize with the server-based file system 290 periodically. In one embodiment, other types of client such as the wireless clients and the Web clients can access the file system 290 via the system server.

In one embodiment, the enterprise server 250 is a logical grouping of the system servers 255 that share a common table owner or a database, point to a common gateway server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile Web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers, individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing functions such as directing client connection requests to an appropriate server (e.g., the least-busy server).

In one embodiment, as illustrated in FIG. 2, the various types of clients that can be supported by the system may include the following clients: dedicated Web clients, mobile Web clients, Web clients, wireless clients, and handheld clients, etc.

In one embodiment, dedicated Web clients (also called connected clients) are connected directly to a database server for data access via a LAN or WAN connection. In one embodiment, these connected or dedicated Web clients do not store data locally. These dedicated Web clients can also access the file system directly. In one embodiment, the user interface, the object manager, and the data manager layers of the multi-layered architecture reside on the dedicated Web client.

In one embodiment, the mobile Web clients are designed and configured for local data access and thus can have their own local database and/or local file system. In one embodiment, mobile Web clients can interact with other components within the system via the gateway server. Through synchronization, the modifications from the local database and the server database can be exchanged.

In one embodiment, a Web client runs in a standard browser format from the client's machine. In one embodiment, the Web client can connect to a system server 255 through a Web server. In one embodiment, the system server 255 is designed and configured to execute business logic and access data from the database 290 and file system 295. In one embodiment, the Web client described herein is designed and configured to operate in an interactive mode. In one embodiment, the interactive Web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc.

In one embodiment, wireless clients are essentially thin clients enabled on wireless devices. The wireless clients can use a wireless application protocol (WAP)-based user interface to communicate and exchange information/data with the system server.

Figure 3:
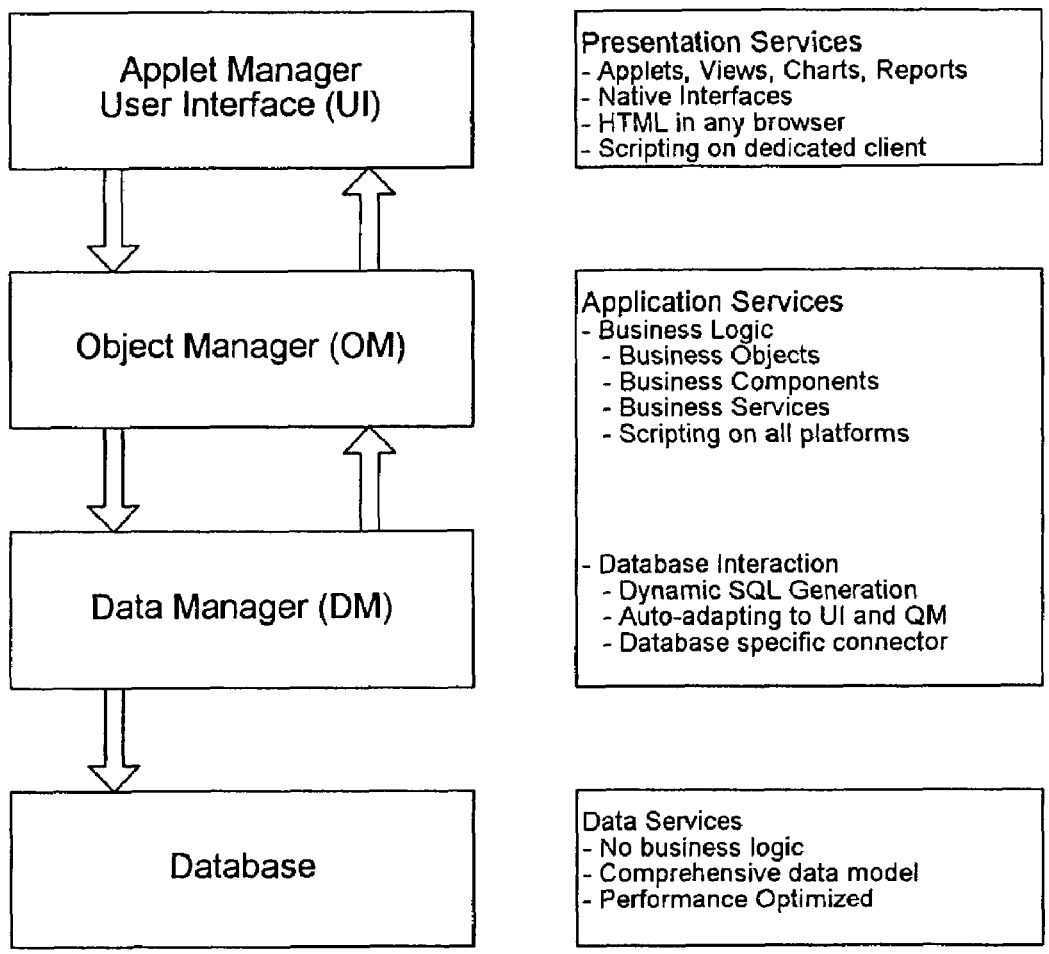
FIG. 3 shows a block diagram illustrating a logical representation of a multi-layered architecture within which the described techniques can be implemented.

FIG. 3 shows a block diagram illustrating another logical representation of a multi-layered architecture. Again, the multi-layered architecture as illustrated in FIG. 3 provides the configured platform for various common services designed to support the various applications. In one embodiment, these various services may include presentation services which correspond to an applet manager and user interface layer, application services which correspond to an object manager (OM) layer and a data manager (DM) layer, and data services which correspond to a database layer.

In one embodiment, the presentation services may be designed and configured to support various types of clients and may provide them with user interface applets, views, charts, and reports, etc. As described above, a large variety of clients may be supported including wireless clients, handheld clients, Web clients, mobile Web clients, and dedicated (connected) clients, etc.

In one embodiment, the application services may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries) necessary to satisfy the request. For example, the data interaction services may be used to translate a call for data into DBMS-specific SQL statements.

In one embodiment, data storage services may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
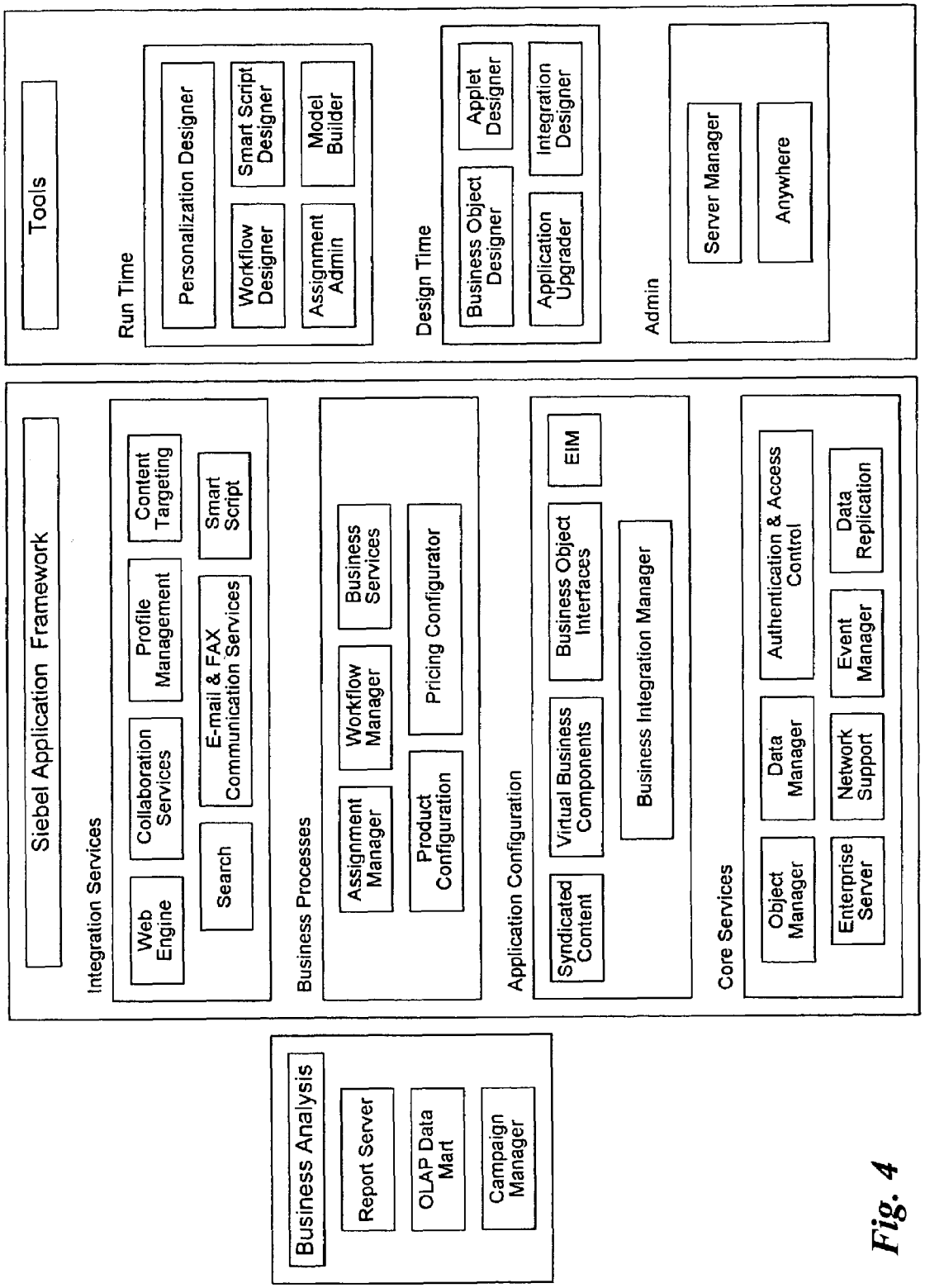
FIG. 4 illustrates a block diagram of one embodiment of an application framework within which the described techniques can be implemented.

FIG. 4 illustrates a block diagram of one embodiment of an application framework. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

the enterprise server, which is the middle-tier application server;

the networks that link all of these pieces together;

facilities like event manager and data replication, which allow sharing data between multiple installations of various applications as well as between the various applications and other external applications; and the authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information and a server having information requested from it.

In one embodiment, business processes services are designed and configured to allow the client to automate business processes through the application. In one embodiment, these various business process services may include the following:

assignment of tasks through Assignment Manager;

enforcement of business practices through Workflow Manager;

reuse of custom business logic through Business Services; and ensuring proper product configuration and pricing through the Product Configurator and Pricing Configurator.

In one embodiment, creation of these business processes can be done through Run-Time tools such as Personalization Designer, Workflow Designer, SmartScript Designer, Assignment Administration Views, the Model Builder, etc.

In one embodiment, integration services may be designed and configured to provide the client with user interface and thin client support. In one embodiment, these may include capabilities for building and maintaining Web-based applications, providing Web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured to provide one place to monitor and administer the application environment. In one embodiment, these services allow the user to administer the application either through a graphic user interface (GUI) or from a command line.

III. Examples And Additional Details

For illustrative purposes, some embodiments of the software facility are described below in which specific types of prototype GUIs with specific types of GUI elements are generated in specific types of ways, and in which such prototype GUIs are converted in specific ways to specific types of actual GUIs. However, those skilled in the art will appreciate that the techniques of the invention can be used in a wide variety of other situations, and that the invention is not limited to use with the illustrated types of prototype and actual GUIs or with the illustrated types of conversion processes.

Figure 5:
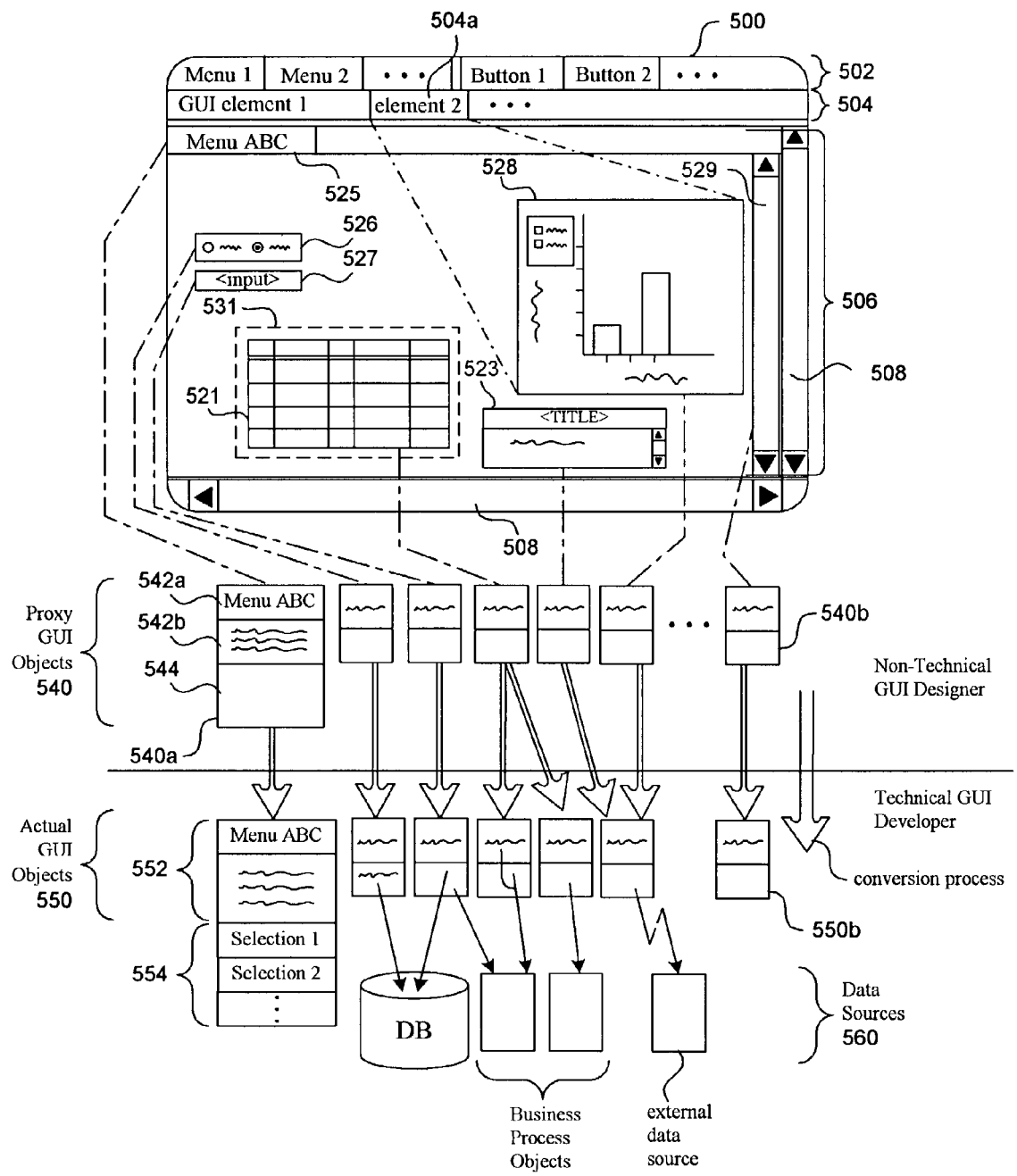
FIG. 5 illustrates an example of converting a prototype GUI into an actual GUI.

FIG. 5 illustrates one example of generating a prototype GUI and converting it into an actual GUI. In particular, a user interface 500 for a software tool is illustrated that is used to visually specify the appearance of a prototype GUI, such as by a non-technical GUI designer in the illustrated embodiment. The software tool user interface includes a variety of controls 502 for providing various functionality, such as various menus and/or buttons available on one or more displayed toolbars for the software tool. In addition, the user interface includes a variety of indications 504 of types of GUI elements that are available to be added to the prototype GUI being created. The software tool user interface also includes scroll bar controls 508 and a display section 506 for displaying a visual representation of a prototype GUI being created. In the illustrated embodiment, the display section 506 is offset from the other portions of the software tool user interface by double lines.

In the illustrated embodiment, the display section 506 includes visual representations of a variety of types of GUI elements for a prototype GUI being created. In particular, the prototype GUI includes a table (or "list") GUI element 521 (e.g., to display information from multiple rows of a database table), a text display GUI element 523, a drop-down menu GUI element 525, an input selection GUI element 526, a text input GUI element 527, a graphical chart GUI element 528, and a scroll bar control GUI element 529. Each of the GUI elements has various associated layout and other appearance information. In addition, all but the scroll bar 529 are of a type in the illustrated embodiment that will have corresponding data when used as part of an actual GUI.

Each of the displayed GUI elements also has a corresponding underlying proxy GUI object 540 that is not displayed or otherwise indicated to the user of the software tool user interface, with the correspondences illustrated by the dashed lines between GUI elements and proxy GUI objects. For example, menu GUI element 525 corresponds to proxy GUI data object 540a. While in the illustrated embodiment the user does not view or have access to the proxy GUI objects, in other embodiments users may be able to view and/or modify proxy GUI objects directly. As is shown, the proxy GUI data object 540a includes a variety of appearance information 542 that was indicated for the GUI element by the GUI designer, such as a display name "ABC" 542a and other appearance information 542b (e.g., location, size, font type, etc.). The proxy GUI data object 540a in the illustrated embodiment also includes one or more stubs for non-appearance information 544 for use as part of an actual GUI, such as functionality to be provided upon selection of menu items, software routines to be invoked to handle various types of interactions (e.g., a right-click), and/or inter-dependencies and other relationships with other various GUI elements. Each of the other proxy GUI objects 540 similarly includes various specified appearance information and lacks various non-appearance information.

While there is a one-to-one correspondence between GUI elements and proxy GUI objects in the illustrated embodiment, other types of relationships may be present in other embodiments. For example, a single proxy GUI object may correspond to multiple GUI elements of a single type (e.g., multiple menus), or instead a single one of the GUI elements may have multiple corresponding proxy GUI objects (e.g., the table 521 may be represented with multiple proxy GUI objects, such as an object for each row and/or column or instead for each cell). In addition, in other embodiments a variety of other types of GUI elements may be available and/or some of the illustrated types of GUI elements may not be used, or instead illustrated types of GUI elements may be specified in other manners (e.g., specifying a table by a series of related column GUI elements rather than as a separate table GUI element). In addition, other types of proxy GUI objects may be used, such as one or more objects that correspond to the prototype GUI as a whole and/or to each of multiple distinct display panes (or "views") of the prototype GUI (not illustrated here), such as to include layout information for the other GUI elements that are part of that container object.

In the illustrated embodiment, some or all of the GUI elements may be specified by the GUI designer in a visual manner, such as by using a drag-and-drop operation for one of the displayed GUI element type indications 540. For example, chart 528 is illustrated in the process of being dragged from GUI element indication 504a. In the illustrated embodiment, the visual representation for this GUI element includes placeholders for data to be later specified, such as captions for the X-axis and Y-axis of the chart, and illustrates a possible appearance of the chart using default data in a bar chart format. In the illustrated embodiment, the GUI designer can modify the appearance of the chart in various ways after it is added to the prototype GUI, such as by specifying captions for the axes, specifying example data to be used as part of the visual representation, specifying a type of formatting (e.g., a type of chart) for data that will be displayed, rearranging sub-elements of the GUI element (e.g., the legend and axes), etc.

In the illustrated embodiment, the chart can be placed at any location that the GUI designer desires, but the prototype GUI may instead or in addition include one or more location placeholders in which one or more GUI elements may be placed, such as template location placeholder 531 in which the table 521 was previously located. More generally, in some embodiments some or all prototype GUIs may have one or more associated GUI templates that include one or more such location placeholders, and if so in some such embodiments the GUI elements to be added to the prototype GUI will each be associated with one of the location placeholders. In addition, while not illustrated here, a prototype GUI may include multiple screens or pages of information, and may include multiple panes per screen/page.

After the prototype GUI has been created, an indication is received to convert the prototype GUI into an actual GUI, such as from the non-technical GUI designer or from a technical GUI developer who will complete the actual GUI. As is shown, the conversion process includes generating actual GUI objects 550 that correspond to the proxy GUI objects and share some or all the appearance information specified for those proxy GUI objects, such as by creating new objects or instead modifying the proxy objects as needed. In addition, as part of the conversion process or after it is completed, the technical GUI developer will then complete the actual GUI in the illustrated embodiment by providing missing information for the actual GUI objects. For example, with respect to actual GUI object 550a that corresponds to the proxy GUI object 540a for menu GUI element 525, the GUI developer specifies various static menu selection item names and corresponding functionality.

In addition, the GUI developer also specifies various data bindings for each of the other actual GUI objects (except for actual GUI object 550b corresponding to the scroll bar 529) to various data sources 560 that will be used to identify data to be displayed for the corresponding GUI elements. In particular, the actual GUI objects for GUI elements 526 and 527 will include data bindings to an indicated database, and the actual GUI objects for GUI elements 521, 523 and 527 will include data bindings to various specified business process objects (that are supported by underlying code and that may themselves have data bindings to various external data sources). In addition, in the illustrated embodiment the appearance information for the actual GUI object corresponding to the table GUI element 521 is also modified by the GUI developer, such as based on a mapping to information from a business process object. As is shown, in the illustrated embodiment a single actual GUI object may have data bindings to multiple data sources, and multiple of the actual GUI objects may have bindings to the same data source. The GUI developer may also specify a variety of other types of nonappearance information (not shown) for the actual GUI objects, such as software handling routines for various user interactions and/or relationships to other actual GUI objects or their corresponding GUI element. Moreover, in some embodiments the GUI developer may also specify a variety of information unrelated to the actual GUI objects as part of the process of generating the actual GUI and/or may take additional actions with respect to the actual GUI objects as part of the actual GUI generation.

FIGS. 6A-6G illustrate an alternative example of generating a prototype GUI for conversion into an actual GUI. In particular, in the illustrated embodiment a software wizard is used to walk a user (e.g., a GUI designer) through the process of creating a GUI element.

Figure 6A:
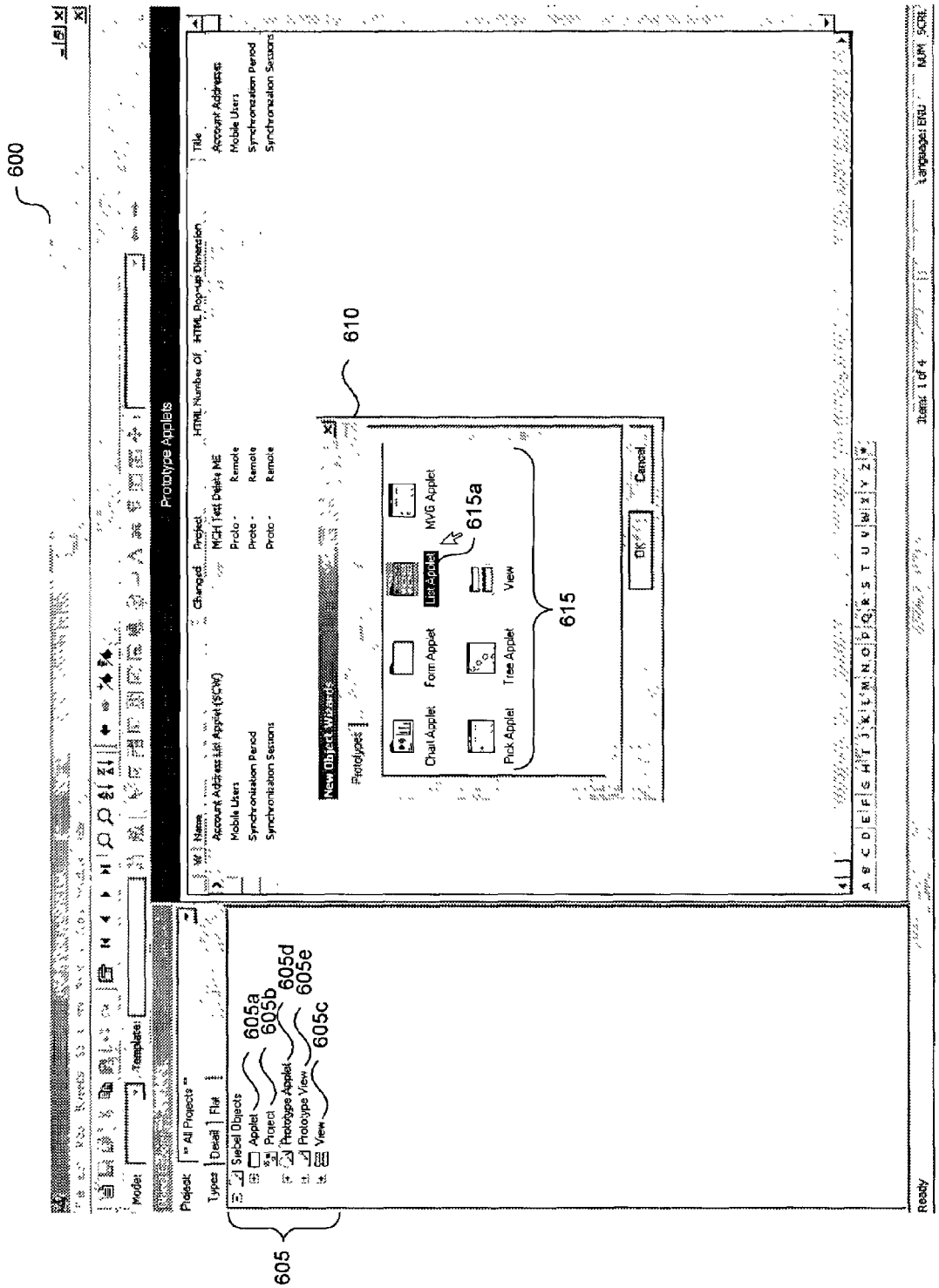
FIGS. 6A-6G illustrate an example of generating a prototype GUI for conversion into an actual GUI.

FIG. 6A illustrates a user interface 600 of a software tool for generating a prototype GUI is illustrated. The user interface 600 includes a pane in which a variety of types of objects 605 can be viewed in a hierarchical manner, including objects representing projects 605b that each have one or more related prototype GUIs, prototype applet objects 605d and prototype view objects 605e that include proxy GUI objects for GUI elements and panes respectively, and applet objects 605a and view objects 605c that include actual GUI objects for GUI elements and panes for actual GUIs respectively. The prototype applet object 605d indication has been selected in the illustrated embodiment, and in response the main view pane includes information about various prototype applets (e.g., proxy GUI objects) that have been added to (in the illustrated embodiment) any of the projects.

In addition, in response to a user indication to add a new prototype applet to a project, a pop-up window 610 has been displayed that includes a variety of indications 615 of types of prototype applets that can be created. In this illustrated embodiment, each indicated type of prototype applet has an associated software wizard that will be executed to assist in the creation of a prototype applet of that type. Thus, the selection of the list applet indication 615a prompts the execution of a corresponding list applet wizard that displays the window 620 illustrated in FIG. 6B.

Figure 6B:
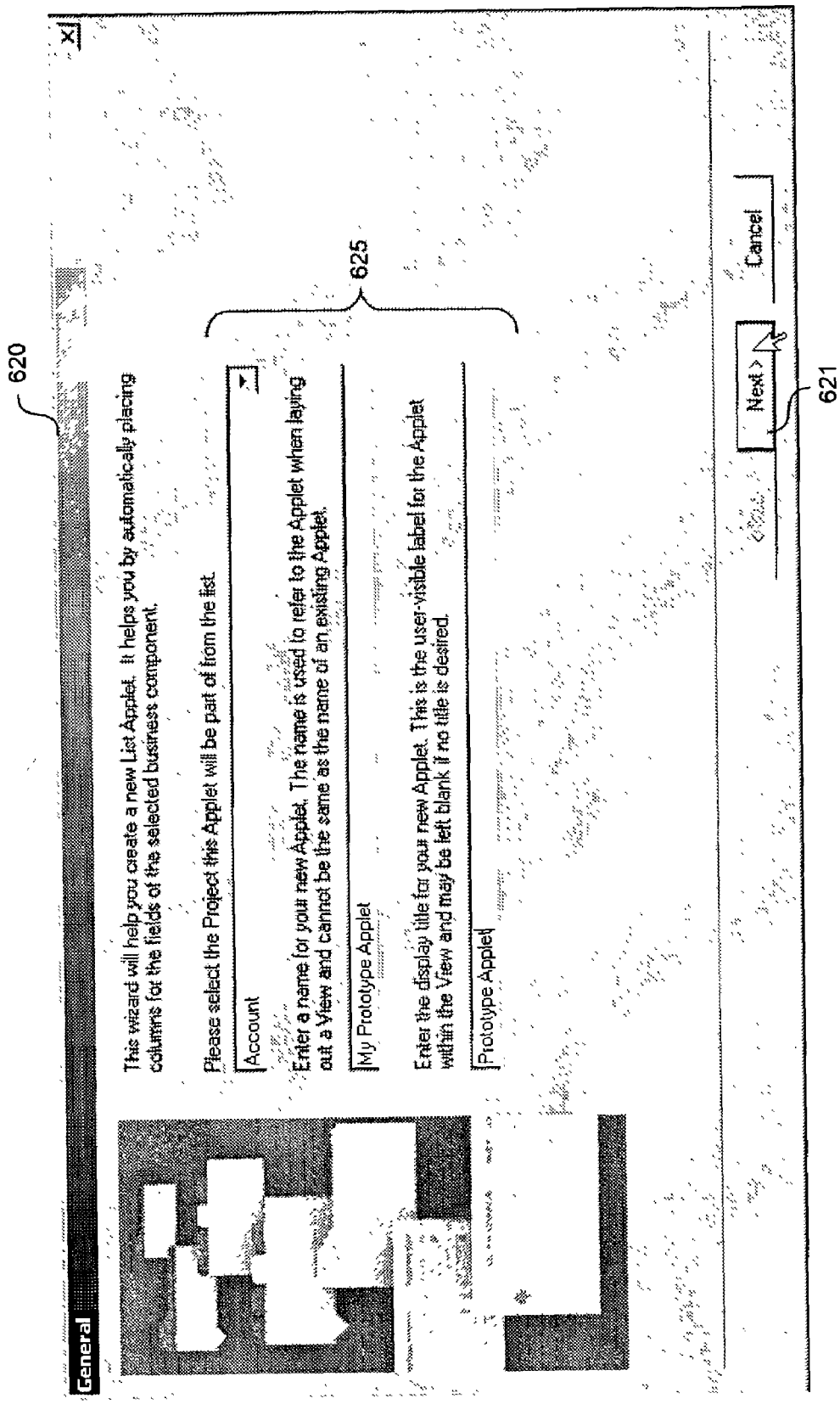
Figure 6C:
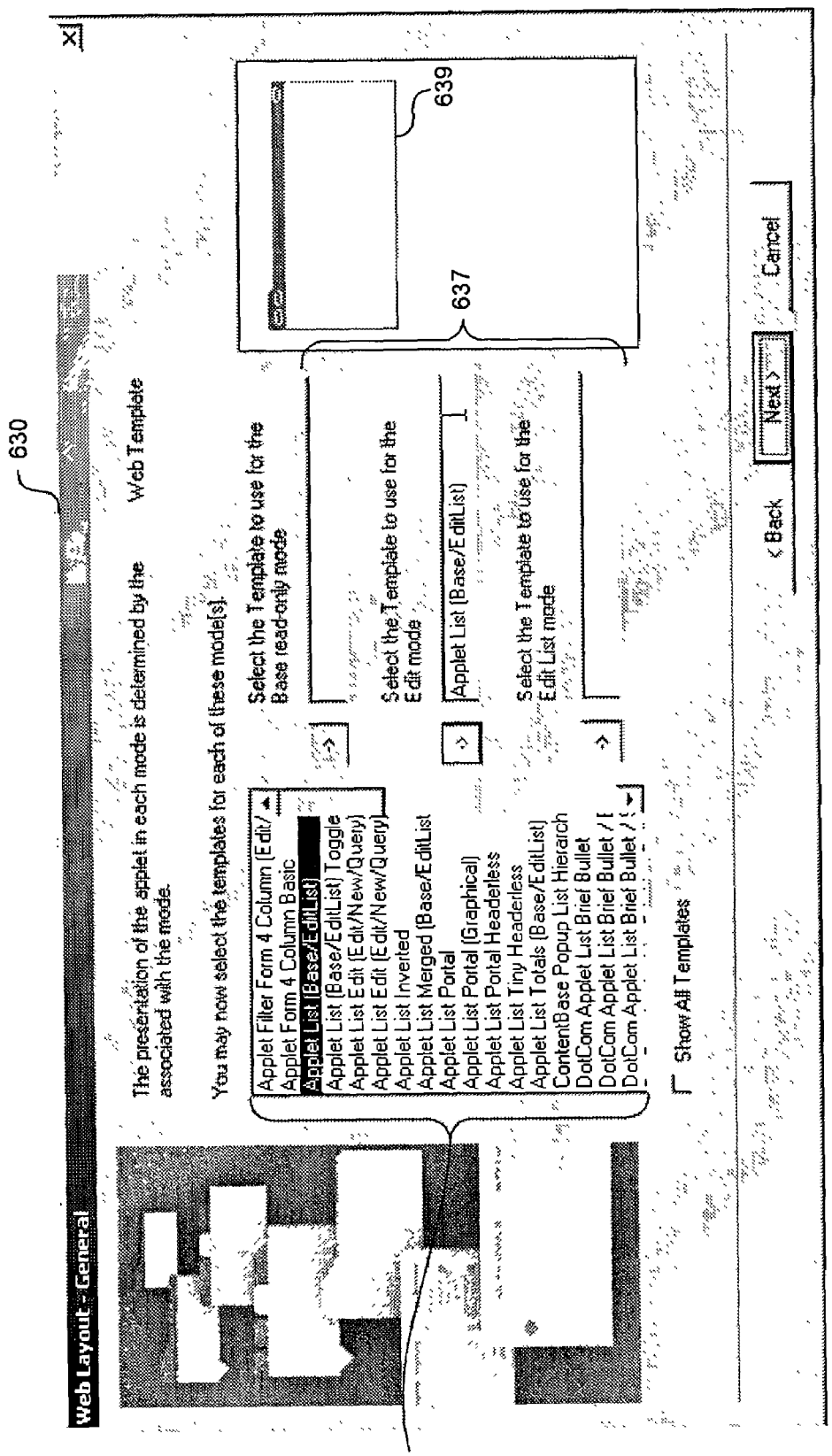
Figure 6D:
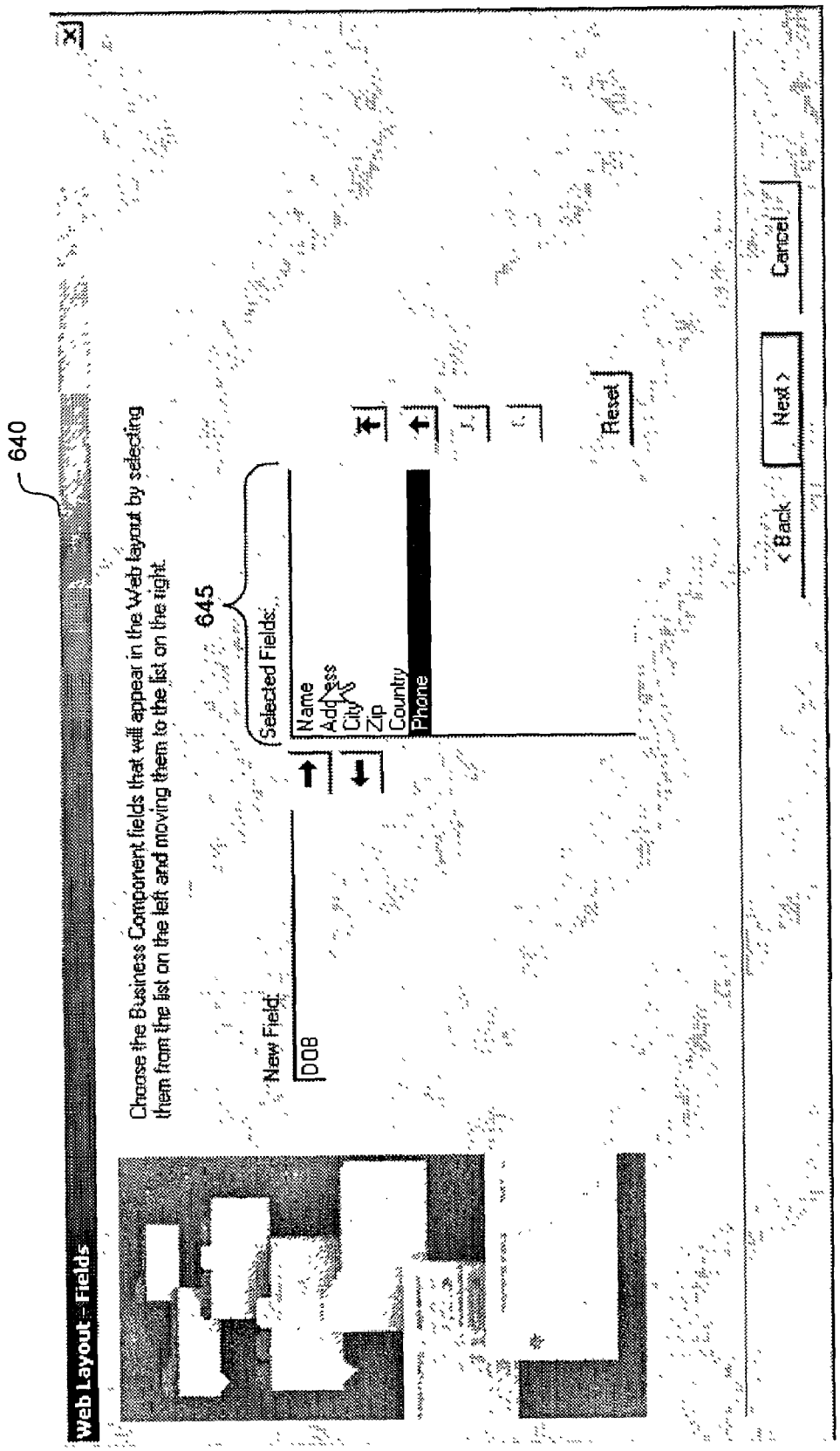

With respect to FIG. 6B, the wizard prompts the user to specify various information 625, including a project to which the list applet being generated will be added, a name for the new applet that is unique with respect to that project, and a display name for the applet. After the information is specified and the user selects the "Next" button 621 to continue, the window 630 illustrated in FIG. 6C is displayed. This window prompts the user to specify various GUI templates 637 to be associated with the applet being generated (e.g., by selecting from a list 635 of various GUI templates), such as separate templates for read-only operations and for editing operations. In addition, in the illustrated embodiment the window displays a visual representation 639 of the selected template in the list 635 (e.g., to display locations of GUI element placeholders). After appropriate templates are selected for the list applet and the user selects the displayed Next button, the wizard then displays the window 640 illustrated in FIG. 6D.

The window 640 prompts the user to specify names 645 of one or more fields to be displayed in the list applet (which in the illustrated embodiment has a visual representation of a table with multiple columns) as well as an order of the field names. In the illustrated embodiment, the field names represent types of data that will be obtained from an external data source (in this illustrated embodiment a business process object, or "business component") when the list applet is displayed as part of an actual GUI.

Figure 6E:
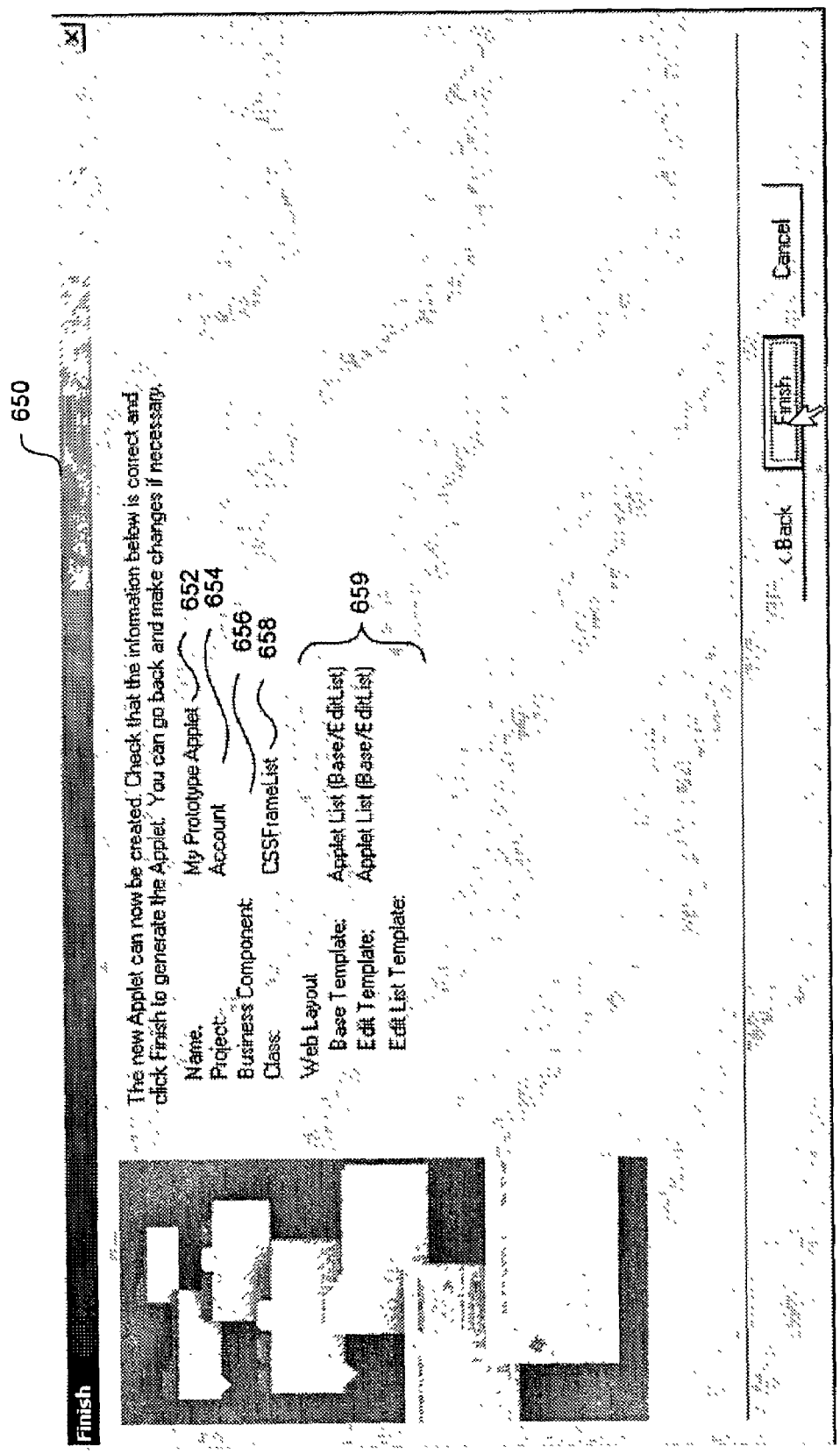

After specifying the field names and selecting the displayed Next button, the wizard displays a window 650 as illustrated in FIG. 6E. This window provides a summary of various information previously specified by the user so that the user can verify the information before completing the creation of the new applet. In the illustrated embodiment, the displayed types of information include an applet name 652, an associated project 654, and various layout templates 659. In addition, the wizard has automatically selected an appropriate type 657 for the object to be created, such as based on the type of applet, the project and/or the selected templates. While this type of applet will use data from an external data source when displayed as part of an actual GUI, indication 656 illustrates that the specification of the external data source is not needed as part of the creation of the prototype applet.

Figure 6F:
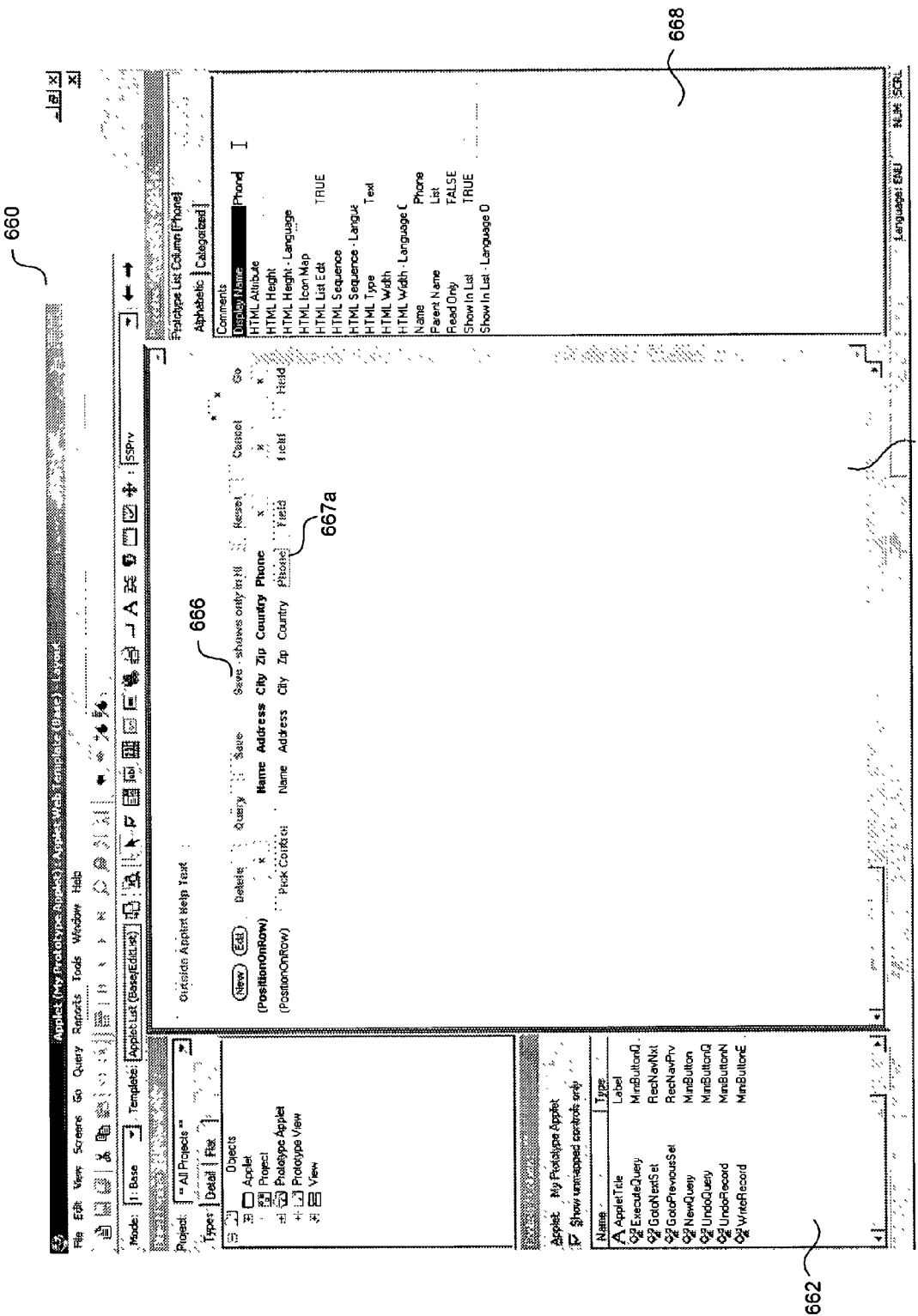

After the various information for the prototype applet has been specified, a visual representation 666 of the corresponding GUI element can be displayed, as is shown in FIG. 6F. In particular, a window 660 is illustrated that includes a pane 665 to represent a prototype GUI. In addition, one of the illustrated columns 667a of the illustrated GUI element 666 has been selected, and a pane 668 of the window provides various detailed information about the selected sub-element. In addition, another pane 662 provides information about various types of non-appearance information that have not yet been specified for the prototype applet.

Figure 6G:
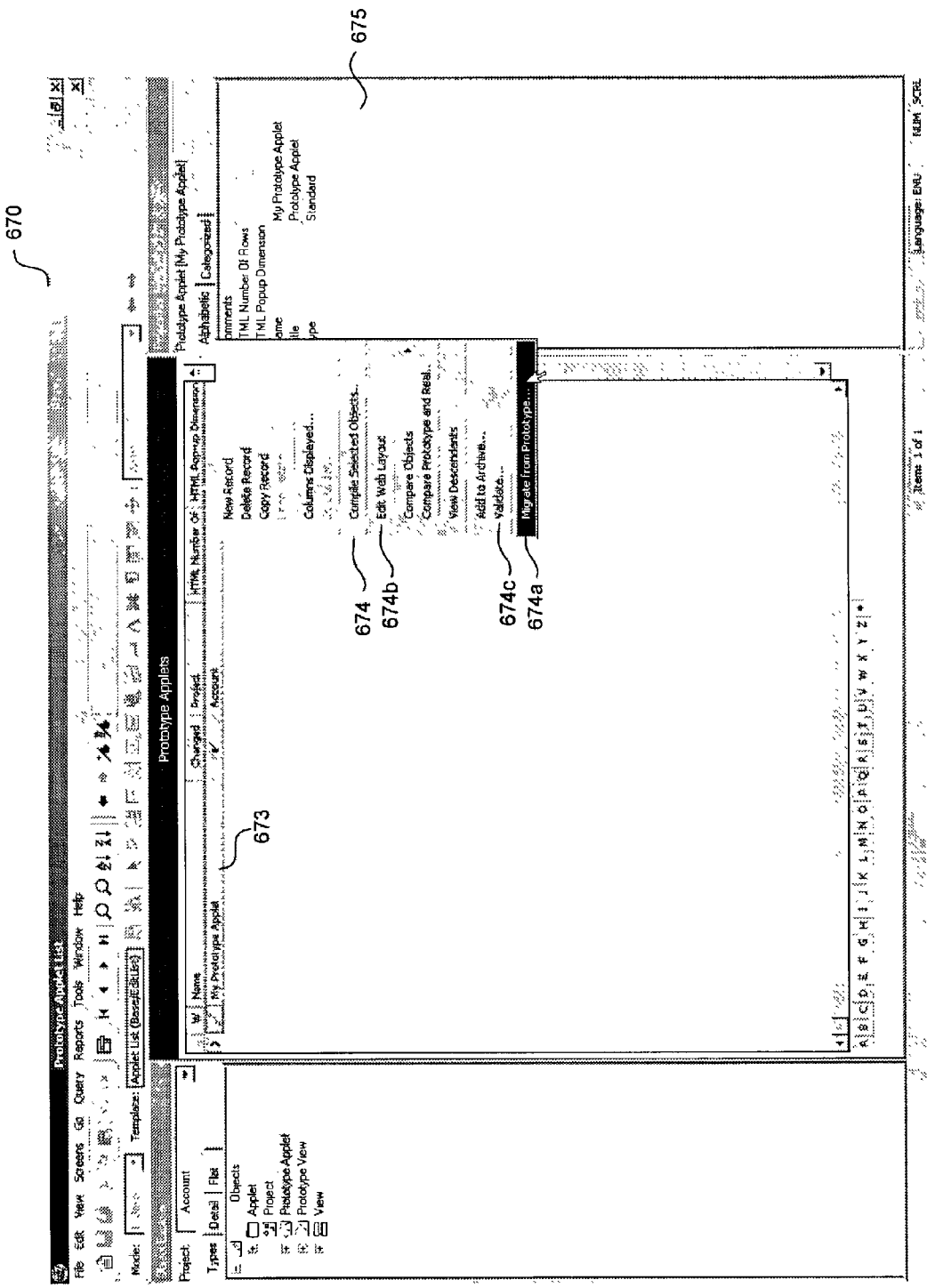

The illustrated software tool can also provide a variety of other types of functionality related to the prototype GUI. For example, FIG. 6G illustrates a window 670 in which a summary indication 673 of the created prototype applet is shown, as well as a pane 675 that provides a variety of details about the newly created prototype applet. A pop-up menu 674 is also illustrated (e.g., in response to an indication from the user) with a variety of options for functionality that can be provided, such as an option 674b to edit the layout of the prototype applet and an option 674c to validate the various prototype applets that have been created (e.g., to determine if all necessary information has been specified and/or if their specification is internally consistent). After the option 674a from the pop-up menu is selected by a user, some or all of the prototype applets (e.g., the selected ones) will be converted into actual GUI objects for an actual GUI.

Those skilled in the art will appreciate that a variety of types of proxy GUI objects can be created in a similar manner by using appropriate software wizards, and that multiple proxy GUI objects can be added to a single prototype GUI. Alternatively, in some embodiments, proxy GUI objects may not be added to a particular prototype GUI or project when created, and instead may later to selected for use in one or more prototype GUIs or projects.

Figure 7:
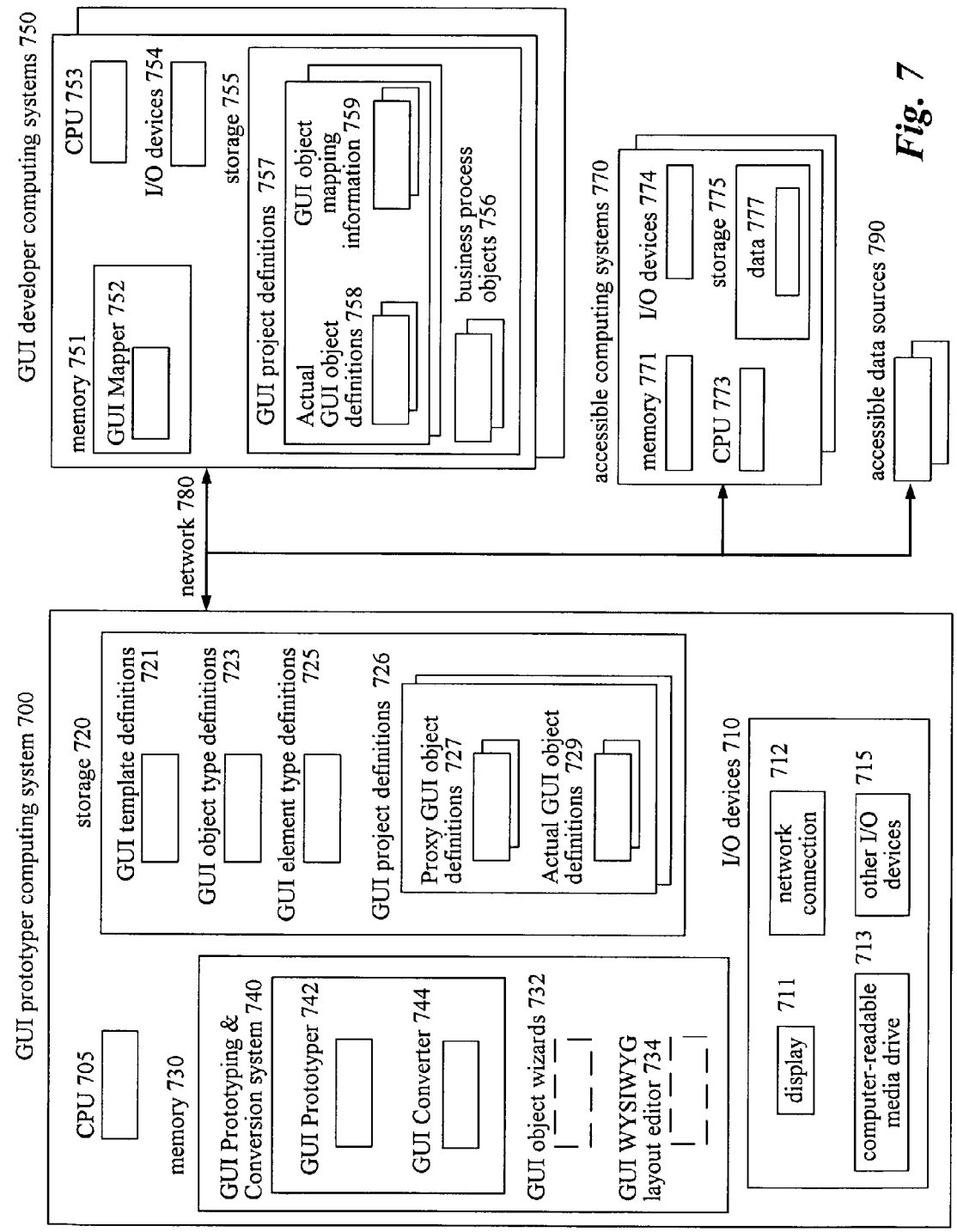
FIG. 7 is a block diagram illustrating an embodiment of a computing system suitable for performing the described techniques.

FIG. 7 is a block diagram illustrating an embodiment of computing systems suitable for generating prototype GUIs and converting prototype GUIs into actual GUIs using the described techniques. In particular, a GUI prototyper computing system 700 is illustrated that provides various functionality related to generating prototype GUIs, and multiple GUI developer computer system 750 are illustrated from which developers can generate actual UIs based on generated prototype GUIs.

The computing system 700 includes a CPU 705, various I/O devices 710, storage 720, and memory 730. The I/O devices include a display 711, a network connection 712, a computer-readable media drive 713, and various other I/O devices 715. The computing system and the functionality it provides can be accessed by users in a variety of ways. For example, some users may have physical access to the computing system 700, and if so may use the I/O devices 710 to interact with the computing system. Alternatively, other users may use remote client computing devices (not shown) to remotely access the computing system 700 (e.g., via the World Wide Web, such as over an intranet and/or the Internet).

An embodiment of a GUI Prototyping and Conversion system 740 is executing in memory 730, and it includes a GUI Prototyper component 742 and in the illustrated embodiment a GUI Converter component 744. The GUI Prototyper component assists users in creating prototype GUIs, and the GUI Converter component creates proxy GUI objects of prototype GUIs into actual GUI objects for use with actual GUIs. As discussed in greater detail below, in other embodiments the GUI Converter component may be present elsewhere, such as on one or more of the GUI developer computing systems 750, either instead of or in addition to being on the GUI prototyper computing system 700. Various other software modules may also be executing in memory on this or other computing systems to provide functionality related to generating prototype GUIs to users, such as one or more GUI object wizard modules 732 and a GUI WYSIWYG layout editor module 734 in memory 730. When present, the GUI object wizards can assist users in generating proxy GUI objects and the GUI WYSIWYG layout editor can assist users in displaying and graphically modifying a visual representation of the prototype GUI.

In the illustrated embodiment, each prototype GUI is part of an associated GUI project and has one or more associated GUI templates that specify various appearance information (e.g., layout information) for the prototype GUI. Thus, when a user begins the process of generating a prototype GUI, the GUI Prototyper component in the illustrated embodiment allows the user to specify an associated GUI project, and a corresponding GUI project definition 726 is created on storage 720 if it is not already present. In addition, the user specifies one or more GUI templates to be used with the prototype GUI, such as by selecting from various GUI template definitions 721 that are present on storage in the illustrated embodiment, and the template information is stored (not shown) in the project definition for the prototype GUI.

The user can then use the GUI Prototyper component to specify a variety of GUI elements to be added to the prototype GUI, such as by selecting from various GUI element type definitions 725 on storage 720. For each indicated GUI element to be added, the GUI Prototyper component identifies an appropriate corresponding GUI object type (e.g., based on the definition of the GUI element type), and generates a proxy GUI object of that type by using appropriate GUI object type definition information 723 on storage 720. The definitions for the created proxy GUI objects 727 are stored on storage 720 as part of the definition for the corresponding GUI project.

After the information for the prototype GUI has been specified, the proxy GUI objects can then be converted into actual GUI objects for use as part of an actual GUI. In the illustrated embodiment, the GUI Converter component is included as part of the GUI prototyper computing system, and thus a user of the system 740 can indicate to perform the conversion. As part of the conversion, the GUI Converter component determines appropriate actual GUI object types for each of the proxy GUI objects (e.g., the same type as the proxy GUI object), and generates an actual GUI object corresponding to each of the proxy GUI objects. In the illustrated embodiment, the generated actual GUI object definitions 729 are then stored on storage 720 as part of the definition of the corresponding GUI project. This information about the generated actual GUI objects can then be made available to one or more GUI developers in various ways, such as based on an indication from the GUI designer and/or a request from the GUI developer.

After a prototype GUI has been converted, a GUI developer can then use one of the GUI developer computing systems 750 to complete the generation of an actual GUI based on the prototype GUI. Each of the computing systems 750 includes a CPU 753, various I/O devices 754, storage 755, and a memory 751 that includes an executing copy of a GUI Mapper component 752. The GUI developer interacts with the GUI Mapper component in order to complete the specification of appropriate information for the actual GUI objects.

In some embodiments, the GUI developer can also initiate the conversion of a prototype GUI, such as by remotely interacting with the GUI Converter component on computing system 700 or by instead interacting with a copy of the GUI Converter component that may be executing in memory 751 in some embodiments. In the illustrated embodiment, however, the conversion was already initiated by the GUI designer, and thus definitions of actual GUI objects were already generated. These actual GUI object definitions 758 have been copied to storage 755 in the illustrated embodiment as part of a definition 757 for the corresponding GUI project, such as by the GUI Mapper component or the GUI Converter component, although in other embodiments the GUI Mapper component may access a single copy of the actual GUI object definitions (e.g., from a remote database). While not illustrated here, the local GUI project definition 757 may also include some or all of the proxy GUI object definitions, although that information may not be needed if the actual GUI object definitions include all relevant information from the proxy GUI objects.

The GUI developer can use the GUI Mapper component to specify a variety of types of additional information for the actual GUI objects, such as data source mappings to data sources that will provide information to be displayed as part of the actual GUI and/or mappings of appropriate software routines for handling various types of user interactions and/or other events. The specified GUI object mapping information 759 is then stored as part of the GUI project definition for the actual GUI being generated (e.g., as part of the actual GUI objects). Various information about data sources or other types of information to be mapped may also be available for use by the GUI Mapper component as part of the mapping, such as business process object information 756 on storage or software routine information (not shown). The GUI Mapper component may also specify data bindings to other external data sources, such as various accessible data sources 790 on the network and/or data 777 that is accessible from storage 775 of one or more accessible computing systems 770, and can similarly specify other types of remote information (not shown) for the actual GUI objects.

After generating an actual GUI, it may be used in various ways. For example, a user may be able to display an actual GUI, such as for testing purposes. In addition, the actual GUI may be associated with underlying code (not shown) and used as part of the execution of that code.

Those skilled in the art will appreciate that in other embodiments the described functionality may be provided in other manners, such as by a single user that uses all of the illustrated components to generate an actual GUI. More generally, computing systems 700 and 750 are merely illustrative and are not intended to limit the scope of the present invention, and may be connected to other devices that are not illustrated (e.g., through one or more networks such as the Internet or via the World Wide Web). Alternatively, some or all of the described functionality may be provided by a single computing system (e.g., a stand-alone system), such as if the GUI Prototyper, GUI Converter and GUI Mapper components are all present on a single computing system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components and data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 8:
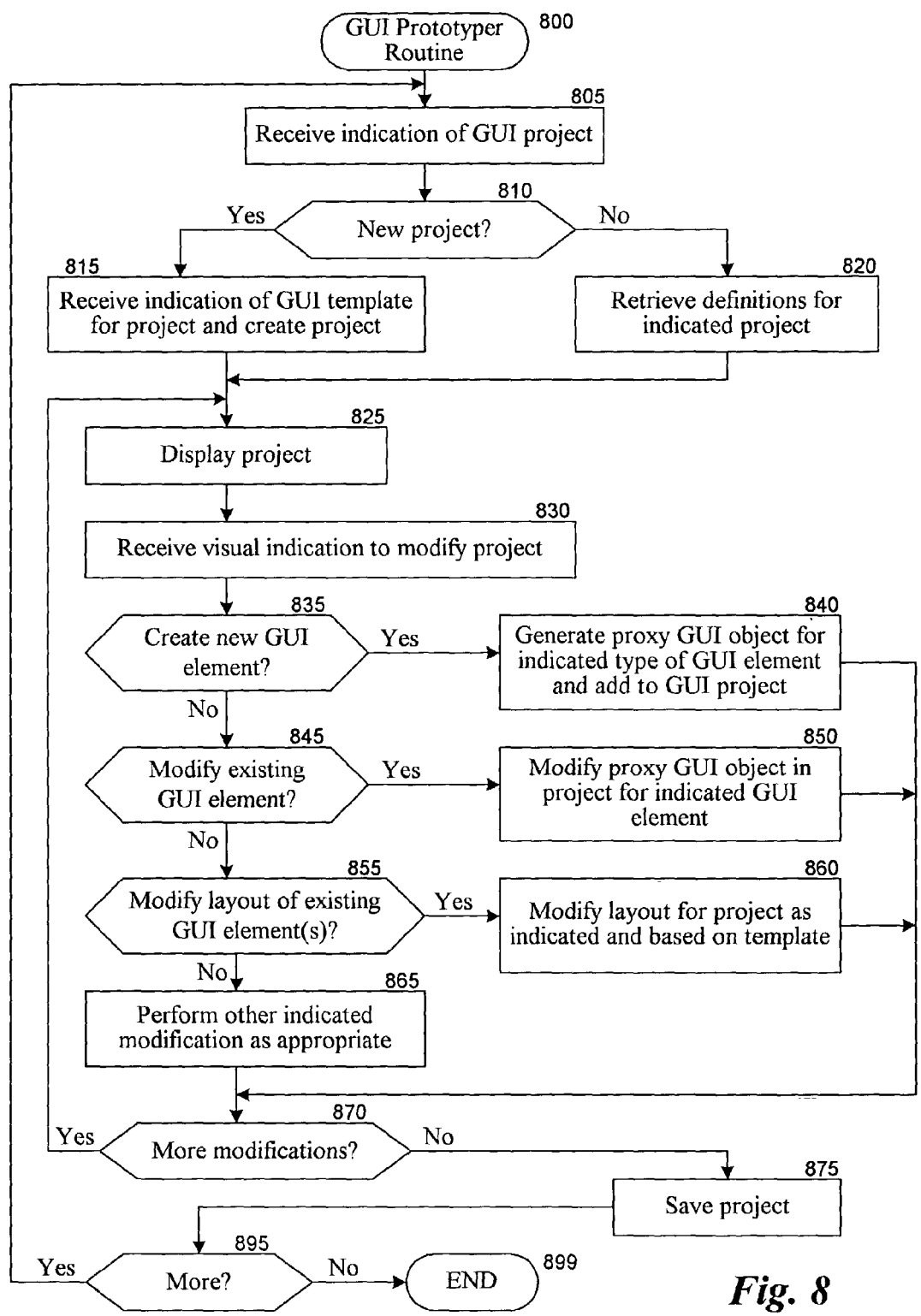
FIG. 8 is a flow diagram of an embodiment of the UI Prototyper routine.

FIG. 8 is a flow diagram of an embodiment of the GUI Prototyper routine 800. The routine receives information from a user (e.g., a GUI designer) about the appearance of various GUI elements to be added to a prototype GUI, and creates appropriate corresponding proxy GUI objects to represent those GUI elements.

The routine begins in step 805 where an indication is received of a GUI project for which a prototype GUI will be generated. The routine continues to step 810 to determine whether the GUI project is a new project, and if so proceeds to step 815 to receive an indication of a GUI template to be associated with the prototype GUI and to create a definition for the project. If it was instead determined in step 810 that the project was not new, the routine instead continues to step 820 to retrieve any existing definitions for the indicated project, such as definitions for existing proxy GUI objects. After steps 815 or 820, the routine continues to step 825 to display a visual representation of the prototype GUI for the project.

The routine then continues to step 830 to receive a visual indication from the user to modify the prototype GUI for the project. If it is next determined in step 835 that the visual indication was to create a new GUI element, the routine continues to step 840 to generate a proxy GUI object based on the indicated type of GUI element and to add the proxy GUI object to the prototype GUI. If it is instead determined in step 835 that the visual indication was not to create a new GUI element, the routine continues to step 845 to determine whether the indication was to modify an existing GUI element. If so, the routine continues to step 850 to modify an existing proxy GUI object that corresponds to the indicated GUI element, and if not the routine continues to step 855 to determine whether the received indication was to modify the layout of one or more existing GUI elements. If so, the routine continues to step 860 to modify the layout for the prototype GUI of the project as indicated and in accordance with the GUI template for the project, and if not the routine continues to step 865 to perform another indicated type of modification as appropriate.

After steps 840, 850, 860 or 865, the routine continues to step 870 to determine if there are more modifications to the prototype GUI for the current GUI project, and if so returns to step 825. If not, the routine continues to step 875 to save the project information, and then continues to step 895 to determine whether to continue. If so, the routine returns to step 805, and if not the routine continues to step 899 and ends.

Figure 9:
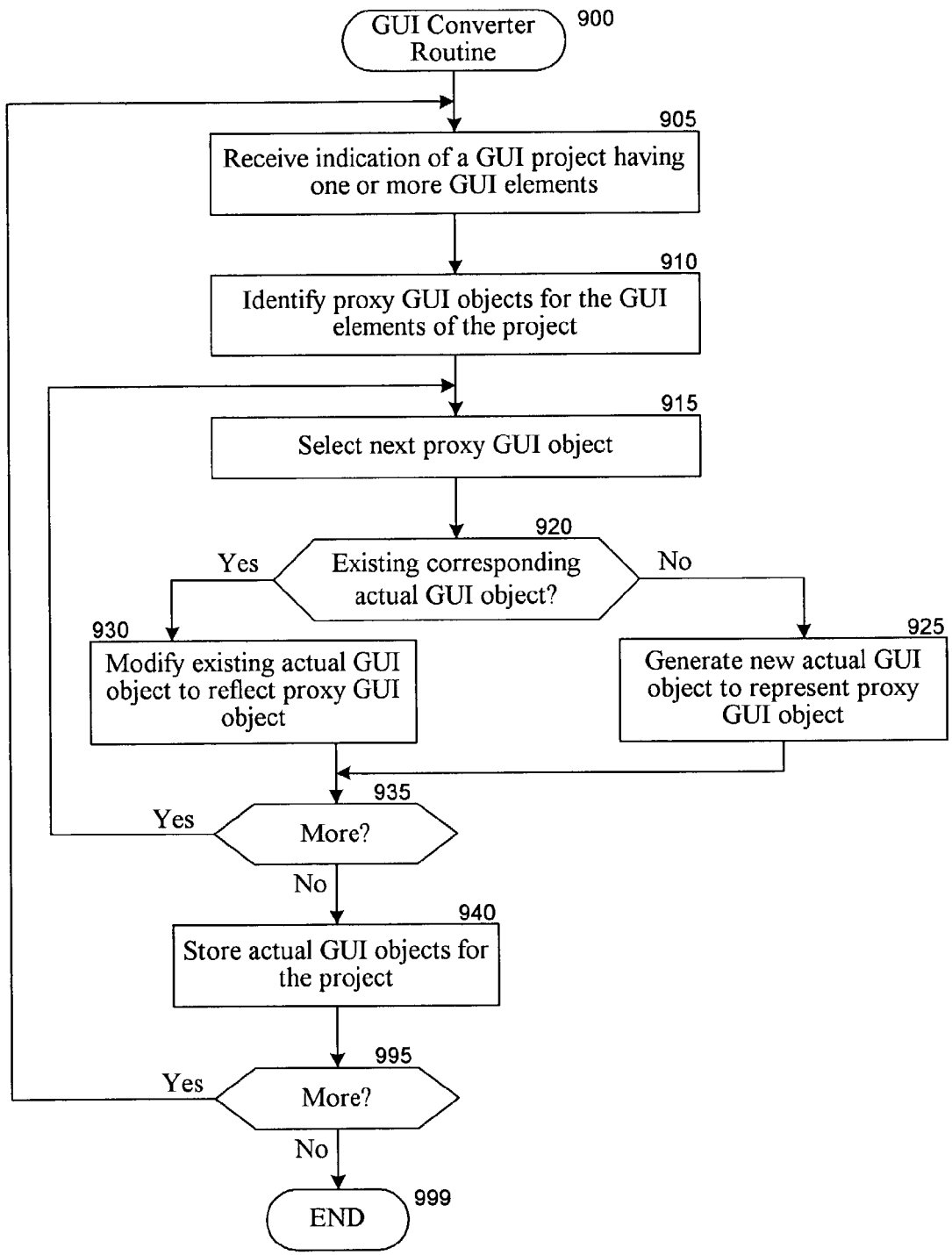
FIG. 9 is a flow diagram of an embodiment of the UI Converter routine.

FIG. 9 is a flow diagram of an embodiment of the GUI Converter routine 900. The routine receives an indication of a prototype GUI to be converted into an actual GUI, and converts the proxy GUI objects for the prototype GUI into actual GUI objects as appropriate.

The routine begins in step 905 where an indication is received of a GUI project that has one or more GUI elements, although in other embodiments particular GUI elements and/or their corresponding proxy GUI objects may instead be selected for conversion. The routine then continues to step 910 to identify proxy GUI objects that correspond to the GUI elements, and in step 915 the routine selects the next proxy GUI object, beginning with the first. The routine then continues to step 920 to determine whether the selected proxy GUI object already has an existing corresponding actual GUI object (e.g., when modifying an existing actual GUI), and if so continues to step 930 to modify the existing actual GUI object to reflect the proxy GUI object as appropriate. If not, the routine continues instead to step 925 to generate a new actual GUI object to represent the proxy GUI object, including copying some or all of the information for the proxy GUI object (e.g., appearance information) to the new actual GUI object.

After steps 925 or 930, the routine continues to step 935 to determine whether there are more proxy GUI objects, and if so returns to step 915. If not, the routine continues to step 940 to store the actual GUI objects for the project. If it is then determined in step 995 to continue, the routine returns to step 905, and if not the routine continues to step 999 and ends.

Figure 10:
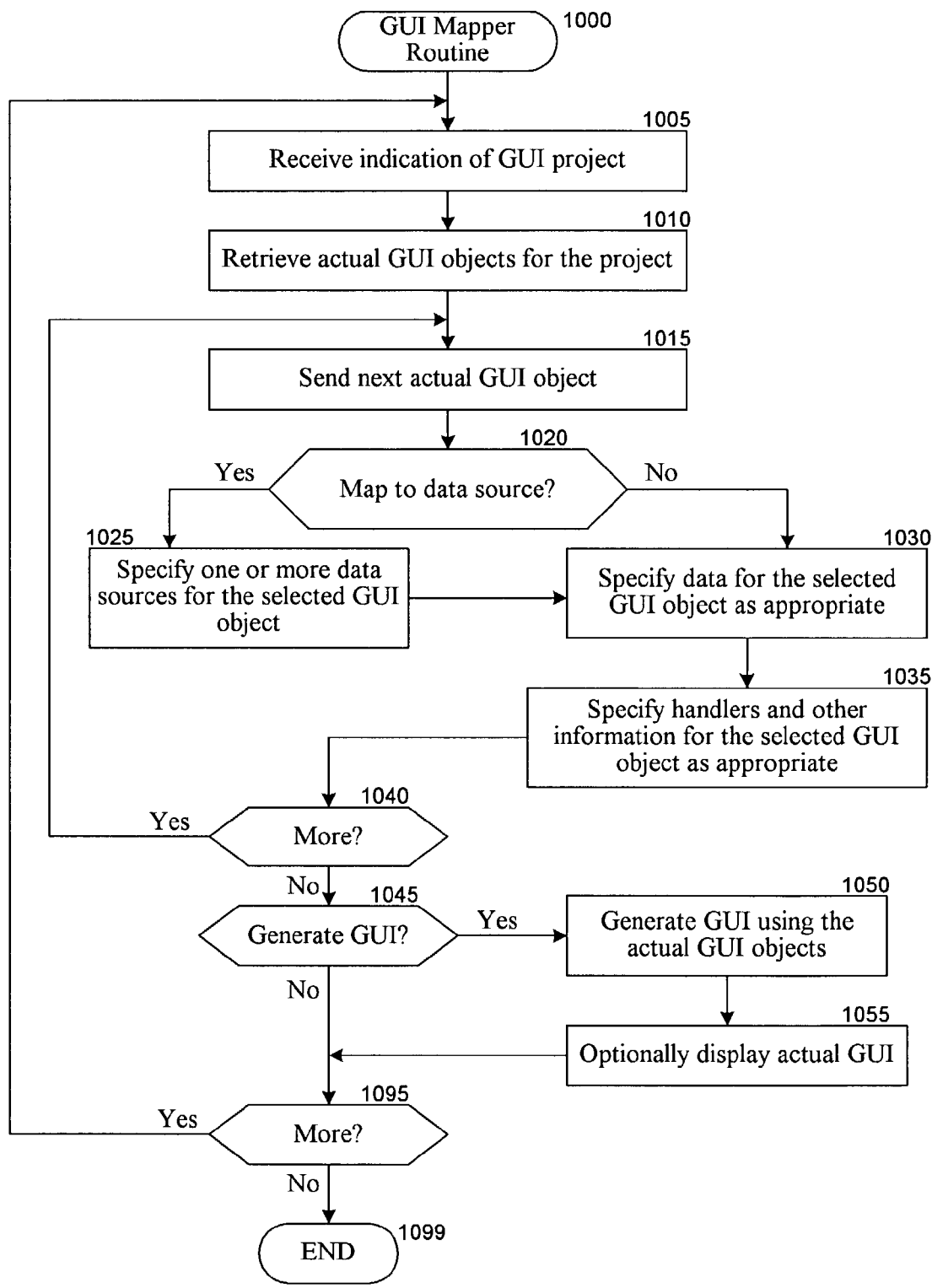
FIG. 10 is a flow diagram of an embodiment of the UI Mapper routine.

FIG. 10 is a flow diagram of the GUI Mapper routine 1000. The routine allows a user to specify an actual GUI by modifying actual GUI objects that were created by converting proxy GUI objects.

The routine begins in step 1005 where an indication is received (e.g., from a user or from the GUI Converter routine) of a GUI project for which a conversion has been performed, although in other embodiments a user could instead indicate that the conversion is to be performed at the current time. The routine then continues to step 1010 to retrieve actual GUI objects for the project that were created from proxy GUI objects during the conversion process. The routine next continues to step 1015 to select the next actual GUI object, beginning with the first. In step 1020, it is then determined whether the actual GUI object is to be bound to an external data source (e.g., based on a type of the actual GUI object), and if so the routine continues to step 1025 to receive indications of one or more such data sources (e.g., from a user) and to associate information about those data sources with the selected actual GUI object. After step 1025, or if it was instead determined in step 1020 that the actual GUI object is not to be bound to an external data source, the routine continues to step 1030 to optionally receive (e.g., from a user) static data (e.g., a display name) to be associated with the selected GUI object.

After step 1030, the routine continues to step 1035 to optionally specify software handlers and/or other information for the selected GUI object as appropriate, such as based on instructions received from a user. The routine then continues to step 1040 to determine whether there are more actual GUI objects, and if so returns to step 1015. If not, the routine continues to step 1045 to determine whether to generate the actual GUI at this time, and if so continues to step 1050 to generate the actual GUI using the actual GUI objects. The routine then continues to step 1055 to optionally display the actual GUI. After step 1055, or if it was instead determined in step 1045 not to generate the actual GUI, the routine continues to step 1095 to determine whether to continue. If so, the routine returns to step 1005, and if not the routine continues to step 1099 and ends.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method in a computing system, the method comprising:
   displaying a visual representation of a prototype GUI;
   generating the prototype GUI by,
      receiving first information about a visual appearance of a first prototype GUI element;
      creating a first proxy GUI object to represent the first prototype GUI element, the created first proxy GUI object comprising the first visual appearance information; receiving second information about a visual appearance of a second prototype GUI element;
      creating a second proxy GUI object to represent the second prototype GUI element, the created second proxy GUI object comprising the second visual appearance information;
      updating the displayed visual representation of the prototype GUI to include;
         a visual representation of the first prototype GUI element that is based on the first visual appearance information from the created first proxy GUI object and that includes one or more placeholders for data from a first of a plurality of data sources;
         a visual representation of the second prototype GUI element that is based on the second visual appearance information from the created second proxy GUI object and that includes one or more placeholders for data from a second of the plurality of data sources, wherein the first and second data sources are distinct from each other;
   generating first and second actual GUI objects that correspond to the first and second proxy GUI objects, respectively, wherein the first and second actual GUI objects comprise the first and second visual appearance information from the first and second proxy GUI objects, respectively;
   modifying the first and second actual GUI objects to include first and second specifications, respectively, of the first and second data sources, respectively; and
   displaying an actual GUI in such a manner as to include first and second actual GUI elements corresponding to the first and second actual GUI objects, respectively, wherein the first and second actual GUI elements are displayed based on the first and second visual appearance information, respectively, from the first and second actual GUI objects, respectively, and wherein the first and second actual GUI elements comprise first and second visual representations, respectively, of data from the first and second data sources, respectively, so that the displayed actual GUI has a visual appearance similar to the updated displayed visual representation of the prototype GUI in addition to visual representation of data from the first and second data sources.

2. The method of claim 1 further comprising:
   receiving first and second layout information for the first and second prototype GUI elements, respectively, added to the prototype GUI; and
   modifying the first and second proxy GUI objects representing the first and second prototype GUI elements, respectively, to include the first and second layout information, respectively, and wherein the first and second actual GUI objects are generated to include the first and second layout information, respectively, from the first and second proxy GUI objects, respectively.

3. The method of claim 2 further comprising an act of receiving information about a GUI template for the prototype GUI that includes first and second location placeholders for holding the first and second prototype GUI elements, respectively, and wherein the first and second layout information for the first and second prototype GUI elements, respectively, include assignments of the first and second prototype GUI elements, respectively, to the first and second location placeholders, respectively.

4. The method of claim 1 further comprising an act of modifying the first and second actual GUI objects to include first and second specifications, respectively of first and second software routines, respectively, to provide functionality to the first and second actual GUI elements in the actual GUI.

5. The method of claim 1 wherein the first and second actual GUI objects are distinct from the first and second proxy GUI objects, respectively, and wherein the generating of the first and second actual GUI objects includes copying information from the first and second proxy GUI objects, respectively.

6. The method of claim 1 further comprising, after the displaying of the actual GUI, modifying the actual GUI by:
   receiving information to modify the first prototype GUI element modifying the proxy GUI object that represent the first prototype GUI element to reflect the received modification information;
   modifying the first actual GUI object to reflect the modification to the first proxy GUI object; and
   displaying an updated version of the actual GUI that includes a modified first actual GUI element, the modified first actual GUI element reflecting the received modification information.

7. A computer readable memory that stores instructions executable by a computer system, wherein the computer system implements a method in response to executing the instructions, the method comprising:
   displaying a visual representation of a prototype GUI;
   generating the prototype GUI by,
      receiving first information about a visual appearance of a first prototype GUI element;
      creating a first proxy GUI object to represent the first prototype GUI element, the created first proxy GUI object comprising the first visual appearance information; receiving second information about a visual appearance of a second prototype GUI element;
      creating a second proxy GUI object to represent the second prototype GUI element, the created second proxy GUI object comprising the second visual appearance information;
      updating the displayed visual representation of the prototype GUI to include;
         a visual representation of the first prototype GUI element that is based on the first visual appearance information from the created first proxy GUI object and that includes one or more placeholders for data from a first of a plurality of data sources;
         a visual representation of the second prototype GUI element that is based on the second visual appearance information from the created second proxy GUI object and that includes one or more placeholders for data from a second of the plurality of data sources, wherein the first and second data sources are distinct from each other;
   generating first and second actual GUI objects that correspond to the first and second proxy GUI objects, respectively, wherein the first and second actual GUI objects comprise the first and second visual appearance information from the first and second proxy GUI objects, respectively;

modifying the first and second actual GUI objects to include first and second specifications, respectively, of the first and second data sources, respectively; and displaying an actual GUI in such a manner as to include first and second actual GUI elements corresponding to the first and second actual GUI objects, respectively, wherein the first and second actual GUI elements are displayed based on the first and second visual appearance information, respectively, from the first and second actual GUI objects, respectively, and wherein the first and second actual GUI elements comprise first and second visual representations, respectively, of data from the first and second data sources, respectively, so that the displayed actual GUI has a visual appearance similar to the updated displayed visual representation of the prototype GUI in addition to visual representation of data from the first and second data sources.

8. The computer readable memory of claim 7, wherein the method further comprises:

receiving first and second layout information for the first and second prototype GUI elements, respectively, added to the prototype GUI; and modifying the first and second proxy GUI objects representing the first and second prototype GUI elements, respectively, to include the first and second layout information, respectively, and wherein the first and second actual GUI objects are generated to include the first and second layout information, respectively, from the first and second proxy GUI objects, respectively.

9. The computer readable memory of claim 8, wherein the method further comprises an act of receiving information about a GUI template for the prototype GUI that includes first and second location placeholders for holding the first and second prototype GUI elements, respectively, and wherein the first and second layout information for the first and second prototype GUI elements, respectively, include assignments of the first and second prototype GUI elements, respectively, to the first and second location placeholders, respectively.

10. The computer readable memory of claim 7, wherein the method further comprises an act of modifying the first and second actual GUI objects to include first and second specifications, respectively of first and second software routines, respectively, to provide functionality to the first and second actual GUI elements in the actual GUI.

11. The computer readable memory of claim 7 wherein the first and second actual GUI objects are distinct from the first and second proxy GUI objects, respectively, and wherein the generating of the first and second actual GUI objects includes copying information from the first and second proxy GUI objects, respectively.

12. The computer readable memory of claim 7, wherein the method further comprises:

after the displaying of the actual GUI, modifying the actual GUI by:

receiving information to modify the first prototype GUI element modifying the proxy GUI object that represent the first prototype GUI element to reflect the received modification information;

modifying the first actual GUI object to reflect the modification to the first proxy GUI object; and displaying an updated version of the actual GUI that includes a modified first actual GUI element, the modified first actual GUI element reflecting the received modification information.

* * * * *

UNITED STATES PATENT AND TRADEMARK OFFICE
CERTIFICATE OF CORRECTION

| | | |
|---|---|---|
| PATENT NO. | : 7,594,181 B2 | Page 1 of 1 |
| APPLICATION NO. | : 10/185401 | |
| DATED | : September 22, 2009 | |
| INVENTOR(S) | : Thomas M. Rothwein et al. | |

It is certified that error appears in the above-identified patent and that said Letters Patent is hereby corrected as shown below:

Title Page, (*) Notice: delete "894 days" and insert -- 1302 days --.

In column 22, line 24, in claim 6, delete "element" and insert -- element; --, therefor.

Signed and Sealed this

Seventeenth Day of August, 2010

David J. Kappos
*Director of the United States Patent and Trademark Office*